US012752564B2

(12) United States Patent
Schwendimann et al.

(10) Patent No.: US 12,752,564 B2
(45) Date of Patent: Oct. 6, 2026

(54) MULTIPLE LAYERED STRUCTURE AND TRANSFER METHOD FOR APPLYING A DESIGN TO FABRIC OR CLOTH

(71) Applicant: Ready, Set, Co., LLC, Plymouth, MN (US)

(72) Inventors: Jodi Schwendimann, Wayzata, MN (US); Hemant Bohra, Minnetonka, MN (US)

(73) Assignee: Ready, Set, Co., LLC, Plymouth, MN (US)

( * ) Notice: Subject to any disclaimer, the term of this patent is extended or adjusted under 35 U.S.C. 154(b) by 116 days.

(21) Appl. No.: 18/941,688

(22) Filed: Nov. 8, 2024

(65) Prior Publication Data

US 2025/0065660 A1 Feb. 27, 2025

Related U.S. Application Data

(63) Continuation of application No. 17/154,449, filed on Jan. 21, 2021, now Pat. No. 12,151,496.

(Continued)

(51) Int. Cl.

*B41M 5/025* (2006.01)
*B41J 2/005* (2006.01)

(Continued)

(52) U.S. Cl.

CPC .......... *B41M 5/0256* (2013.01); *B41J 2/0057* (2013.01); *B41J 2/2114* (2013.01);

(Continued)

(58) Field of Classification Search

CPC ... B41J 2/01; B41J 2/211; B41J 2/1433; B41J 2/17; B41J 2/17593; B41J 2/2107;

(Continued)

(56) References Cited

U.S. PATENT DOCUMENTS 3,790,439 A 2/1974 La Perre et al.
3,922,435 A 11/1975 Asnes (Continued)

FOREIGN PATENT DOCUMENTS

EP 0466503 A1 1/1992
EP 0782931 A1 7/1997

(Continued)

OTHER PUBLICATIONS

U.S. Appl. No. 11/054,717, Response filed May 14, 2009 to Non Final Office Action mailed Jan. 9, 2009, 12 pgs.

(Continued)

*Primary Examiner* — Manish S Shah
(74) *Attorney, Agent, or Firm* — Padda Law Group

(57) ABSTRACT

A multiple layered print structure and apparatus to apply a design or image to fabric or cloth is disclosed. The structure may include one or more print layers printed on a substrate and an adhesive layer deposited on the print layer(s). The one or more print layer(s) and adhesive or resin layer may be deposited on the substrate in a pre-set pattern to form the shape profile for the design or image. The print layer(s) include inks or dyes for printing the print features and/or background color(s) of the image or design. The ink may be combined with a binder material to form the print layer(s). In some embodiments, the process includes the step of printing the multiple layered print structure using a combination of digital printing processes simplify the process for printing a design or image on fabric or cloth.

24 Claims, 19 Drawing Sheets

Related U.S. Application Data

(60) Provisional application No. 62/963,846, filed on Jan. 21, 2020.

(51) Int. Cl.
*B41J 2/21* (2006.01)
*B41M 5/00* (2006.01)

(52) U.S. Cl.
CPC .......... *B41J 2/2117* (2013.01); *B41M 5/0047* (2013.01); *B41M 5/025* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41J 3/4078; B41J 11/0021; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227; B41M 5/0256; B41M 5/025; B41F 23/042; B41F 23/0436
See application file for complete search history.

(56) References Cited

U.S. PATENT DOCUMENTS

| | | | |
|---|---|---|---|
| 4,102,456 | A | 7/1978 | Morris |
| 4,169,169 | A | 9/1979 | Kitabatake |
| 4,224,358 | A | 9/1980 | Hare |
| 4,235,657 | A | 11/1980 | Greenman et al. |
| 4,284,456 | A | 8/1981 | Hare |
| 4,399,209 | A | 8/1983 | Sanders et al. |
| 4,461,793 | A | 7/1984 | Blok et al. |
| 4,548,857 | A | 10/1985 | Galante |
| 4,549,824 | A | 10/1985 | Sachdev et al. |
| 4,594,276 | A | 6/1986 | Relyea |
| 4,685,984 | A | 8/1987 | Powers et al. |
| 4,758,952 | A | 7/1988 | Harris, Jr. et al. |
| 4,863,781 | A | 9/1989 | Kronzer et al. |
| 4,880,678 | A | 11/1989 | Goffi |
| 4,966,815 | A | 10/1990 | Hare |
| 4,980,224 | A | 12/1990 | Hare |
| 5,019,475 | A | 5/1991 | Higashiyama et al. |
| 5,028,028 | A | 7/1991 | Yamada et al. |
| 5,045,383 | A | 9/1991 | Maeda et al. |
| 5,059,580 | A | 10/1991 | Shibata et al. |
| 5,097,861 | A | 3/1992 | Hopkins et al. |
| 5,110,389 | A | 5/1992 | Hiyoshi et al. |
| 5,133,819 | A | 7/1992 | Abe et al. |
| 5,139,917 | A | 8/1992 | Hare |
| 5,217,793 | A | 6/1993 | Yamane et al. |
| 5,236,801 | A | 8/1993 | Hare |
| 5,242,739 | A | 9/1993 | Kronzer |
| 5,252,531 | A | 10/1993 | Yasuda et al. |
| 5,271,990 | A | 12/1993 | Kronzer et al. |
| 5,334,439 | A | 8/1994 | Kawaguchi et al. |
| 5,350,474 | A | 9/1994 | Yamane |
| 5,362,703 | A | 11/1994 | Kawasaki et al. |
| 5,372,884 | A | 12/1994 | Abe et al. |
| 5,400,246 | A | 3/1995 | Wilson et al. |
| 5,407,724 | A | 4/1995 | Mimura et al. |
| 5,431,501 | A | 7/1995 | Hale et al. |
| 5,434,598 | A | 7/1995 | Shimomine et al. |
| 5,501,902 | A | 3/1996 | Kronzer |
| 5,521,229 | A | 5/1996 | Lu et al. |
| 5,593,808 | A | 1/1997 | Ellis |
| 5,614,345 | A | 3/1997 | Gumbiowski et al. |
| 5,620,548 | A | 4/1997 | Hare |
| 5,665,476 | A | 9/1997 | Oez |
| 5,707,925 | A | 1/1998 | Akada et al. |
| 5,770,268 | A | 6/1998 | Kuo et al. |
| 5,798,161 | A | 8/1998 | Kita et al. |
| 5,798,179 | A | 8/1998 | Kronzer |
| 5,821,028 | A | 10/1998 | Maejima et al. |
| 5,833,790 | A | 11/1998 | Hare |
| 5,861,355 | A | 1/1999 | Olson et al. |
| 5,905,497 | A | 5/1999 | Vaughan et al. |
| 5,917,730 | A | 6/1999 | Rittie et al. |
| 5,925,712 | A | 7/1999 | Kronzer |
| 5,942,335 | A | 8/1999 | Chen et al. |
| 5,948,586 | A | 9/1999 | Hare |
| 5,962,149 | A | 10/1999 | Kronzer |
| 5,981,045 | A | 11/1999 | Kuwabara et al. |
| 5,981,077 | A | 11/1999 | Taniguchi |
| 6,017,611 | A | 1/2000 | Cheng et al. |
| 6,033,739 | A | 3/2000 | Kronzer |
| 6,033,824 | A | 3/2000 | Hare |
| 6,036,808 | A | 3/2000 | Shaw-Klein et al. |
| 6,042,914 | A | 3/2000 | Lubar |
| 6,054,223 | A | 4/2000 | Tsuchiya et al. |
| 6,066,387 | A | 5/2000 | Ueda et al. |
| 6,071,368 | A | 6/2000 | Boyd et al. |
| 6,083,656 | A | 7/2000 | Hare et al. |
| 6,087,061 | A | 7/2000 | Hare et al. |
| 6,090,520 | A | 7/2000 | Hare et al. |
| 6,096,475 | A | 8/2000 | Hare et al. |
| 6,106,982 | A | 8/2000 | Mientus et al. |
| 6,108,256 | A | 8/2000 | Schneider |
| 6,113,725 | A | 9/2000 | Kronzer |
| 6,120,888 | A | 9/2000 | Dolsey et al. |
| 6,139,672 | A | 10/2000 | Sato et al. |
| 6,177,187 | B1 | 1/2001 | Niemoller et al. |
| 6,197,420 | B1 | 3/2001 | Takamizawa |
| 6,200,668 | B1 | 3/2001 | Kronzer |
| 6,242,082 | B1 | 6/2001 | Mukoyoshi et al. |
| 6,245,710 | B1 | 6/2001 | Hare |
| 6,258,448 | B1 | 7/2001 | Hare |
| 6,265,128 | B1 | 7/2001 | Hare et al. |
| 6,331,374 | B1 | 12/2001 | Hare et al. |
| 6,338,932 | B2 | 1/2002 | Hare et al. |
| 6,340,550 | B2 | 1/2002 | Hare et al. |
| 6,358,660 | B1 | 3/2002 | Agler et al. |
| 6,383,710 | B2 | 5/2002 | Hare et al. |
| 6,423,466 | B2 | 7/2002 | Hare |
| 6,428,878 | B1 | 8/2002 | Kronzer |
| 6,450,633 | B1 | 9/2002 | Kronzer |
| 6,495,241 | B2 | 12/2002 | Sato et al. |
| 6,497,781 | B1 | 12/2002 | Dalvey et al. |
| 6,506,445 | B2 | 1/2003 | Popat et al. |
| 6,509,131 | B2 | 1/2003 | Hare et al. |
| 6,513,924 | B1 | 2/2003 | Goldberg et al. |
| 6,521,327 | B1 | 2/2003 | Franke |
| 6,531,216 | B1 | 3/2003 | Williams et al. |
| 6,539,652 | B1 | 4/2003 | Barry |
| 6,551,692 | B1 | 4/2003 | Dalvey et al. |
| 6,582,803 | B2 | 6/2003 | Cole et al. |
| 6,638,604 | B1 | 10/2003 | Bamberg et al. |

(56) References Cited

U.S. PATENT DOCUMENTS

| | | | |
|---|---|---|---|
| 6,638,682 B2 | 10/2003 | Hare et al. | |
| 6,667,093 B2 | 12/2003 | Yuan et al. | |
| 6,677,009 B2 | 1/2004 | Boyd et al. | |
| 6,703,086 B2 | 3/2004 | Kronzer et al. | |
| 6,723,773 B2 | 4/2004 | Williams et al. | |
| 6,753,050 B1 | 6/2004 | Dalvey et al. | |
| 6,786,994 B2 | 9/2004 | Williams et al. | |
| 6,849,312 B1 | 2/2005 | Williams | |
| 6,869,910 B2 | 3/2005 | Williams et al. | |
| 6,871,950 B2 | 3/2005 | Higuma et al. | |
| 6,875,487 B1 | 4/2005 | Williams et al. | |
| 6,878,423 B2 | 4/2005 | Nakanishi | |
| 6,884,311 B1 | 4/2005 | Dalvey et al. | |
| 6,916,589 B2 | 7/2005 | Hare et al. | |
| 6,916,751 B1 | 7/2005 | Kronzer | |
| 6,951,671 B2 | 10/2005 | Mukherjee et al. | |
| 6,998,211 B2 | 2/2006 | Riley et al. | |
| 7,001,649 B2 | 2/2006 | Wagner et al. | |
| 7,008,746 B2 | 3/2006 | Williams et al. | |
| 7,021,666 B2 | 4/2006 | Hare | |
| 7,022,385 B1 | 4/2006 | Nasser | |
| 7,026,024 B2 | 4/2006 | Chang et al. | |
| 7,081,324 B1 | 7/2006 | Hare et al. | |
| 7,160,411 B2 | 1/2007 | Williams et al. | |
| 7,220,705 B2 | 5/2007 | Hare | |
| 7,238,410 B2 | 7/2007 | Kronzer | |
| 7,361,247 B2 | 4/2008 | Kronzer | |
| 7,364,636 B2 | 4/2008 | Kronzer | |
| 7,571,695 B2 | 8/2009 | Taylor et al. | |
| 7,749,581 B2 | 7/2010 | Dalvey et al. | |
| 7,754,042 B2 | 7/2010 | Dalvey et al. | |
| 7,766,475 B2 | 8/2010 | Dalvey et al. | |
| 7,771,554 B2 | 8/2010 | Dalvey et al. | |
| RE41,623 E | 9/2010 | Schwendimann et al. | |
| 7,791,562 B2 | 9/2010 | Mueller et al. | |
| 7,824,748 B2 | 11/2010 | Dalvey et al. | |
| 7,897,228 B2 | 3/2011 | Steinhardt | |
| 7,906,189 B2 | 3/2011 | Tsai et al. | |
| 8,465,144 B2 | 6/2013 | Marino et al. | |
| 8,765,257 B2 | 7/2014 | Weedlun | |
| 9,391,910 B2 | 7/2016 | Suzuki et al. | |
| 9,573,349 B1 | 2/2017 | Dannhauser et al. | |
| 10,696,039 B2 | 6/2020 | Mark et al. | |
| 2001/0051265 A1 | 12/2001 | Williams et al. | |
| 2002/0025208 A1 | 2/2002 | Sato et al. | |
| 2002/0040648 A1 | 4/2002 | DeProspero | |
| 2002/0048656 A1 | 4/2002 | Sato et al. | |
| 2002/0192434 A1 | 12/2002 | Yuan et al. | |
| 2003/0008112 A1 | 1/2003 | Cole et al. | |
| 2003/0021962 A1 | 1/2003 | Mukherjee et al. | |
| 2003/0178495 A1 | 9/2003 | Jones | |
| 2004/0032477 A1* | 2/2004 | Baker, Jr. | B41J 11/0015 347/102 |
| 2004/0100546 A1 | 5/2004 | Horvath | |
| 2004/0146700 A1 | 7/2004 | Boyd et al. | |
| 2004/0161566 A1 | 8/2004 | Truog | |
| 2005/0048230 A1 | 3/2005 | Dalvey et al. | |
| 2006/0154180 A1 | 7/2006 | Kannurpatti | |
| 2007/0103529 A1 | 5/2007 | Pearl et al. | |
| 2007/0104899 A1 | 5/2007 | Pearl et al. | |
| 2007/0172609 A1 | 7/2007 | Williams | |
| 2007/0172610 A1 | 7/2007 | Williams | |
| 2007/0221317 A1 | 9/2007 | Kronzer et al. | |
| 2007/0231509 A1 | 10/2007 | Xu et al. | |
| 2007/0231525 A1 | 10/2007 | Bodwell | |
| 2007/0289703 A1* | 12/2007 | Chamandy | B41M 5/0256 156/240 |
| 2008/0149263 A1 | 6/2008 | Dalvey et al. | |
| 2008/0152809 A1* | 6/2008 | Baker | B41J 11/0015 118/313 |
| 2008/0302473 A1 | 12/2008 | Dalvey et al. | |
| 2008/0305253 A1 | 12/2008 | Dalvey et al. | |
| 2008/0305288 A1 | 12/2008 | Dalvey et al. | |
| 2010/0291331 A1 | 11/2010 | Schaefer | |
| 2012/0040154 A1 | 2/2012 | Dinescu et al. | |
| 2013/0004742 A1* | 1/2013 | La Costa | B41J 2/0057 347/103 |
| 2016/0358519 A1 | 12/2016 | Daley | |
| 2018/0224436 A1 | 8/2018 | Edwards | |
| 2019/0118575 A1 | 4/2019 | McGovern | |
| 2020/0046075 A1 | 2/2020 | Sterman et al. | |
| 2020/0096910 A1* | 3/2020 | Weedlun | B41M 7/0027 |
| 2023/0118044 A1* | 4/2023 | Weedlun | B41M 5/52 428/32.78 |
| 2023/0137201 A1* | 5/2023 | Murate | B41M 7/0027 347/103 |
| 2023/0193069 A1* | 6/2023 | Van Keulen | C09D 11/54 347/95 |
| 2023/0406008 A1* | 12/2023 | Van Heijst | B41J 11/0015 |
| 2025/0065658 A1* | 2/2025 | Schwendimann | B41M 5/0256 |
| 2025/0065659 A1* | 2/2025 | Schwendimann | B41M 5/0256 |
| 2025/0256523 A1* | 8/2025 | Schwendimann | B41M 5/0256 |
| 2026/0070364 A1* | 3/2026 | Schwendimann | B41M 5/0256 |

FOREIGN PATENT DOCUMENTS

| | | |
|---|---|---|
| EP | 0881092 A2 | 12/1998 |
| EP | 0899121 A1 | 3/1999 |
| EP | 0933225 A1 | 8/1999 |
| EP | 1699639 B1 | 5/2011 |
| EP | 3145721 B1 | 7/2020 |
| FR | 2442721 A1 | 6/1980 |
| GB | 2295973 A | 6/1996 |
| JP | 63122592 | 5/1988 |
| JP | 1037233 | 2/1989 |
| JP | 7276833 | 10/1995 |
| JP | 8085269 | 4/1996 |
| JP | H0978473 A | 3/1997 |
| KR | 200257307 Y1 | 12/2001 |
| KR | 20100010229 U | 10/2010 |
| WO | 0073570 A1 | 12/2000 |
| WO | 2008115374 A1 | 9/2008 |

OTHER PUBLICATIONS

U.S. Appl. No. 12/193,573, Non-Final Office Action mailed Apr. 7, 2009, 4 pgs.

U.S. Appl. No. 12/193,573, Response filed Jun. 15, 2009 to Non Final Office Action mailed Apr. 7, 2009, 19 pgs.

U.S. Appl. No. 12/193,578, Response filed Jun. 15, 2009 to Non Final Office Action mailed Feb. 11, 2009, 16 pgs.

U.S. Appl. No. 12/034,932 Non Final Office Action Mailed Sep. 10, 2009, 15 pgs.

U.S. Appl. No. 12/193,573 Non Final Office Action Mailed Sep. 11, 2009, 5 pgs.

U.S. Appl. No. 12/193,578 Non Final Office Action Mailed Sep. 11, 2009, 5 pgs.

U.S. Appl. No. 10/911,249, Final Office Action mailed Jun. 30, 2009, 5 pgs.

U.S. Appl. No. 10/911,249, Response filed Nov. 30, 2009 to Non Final Office Action mailed Sep. 21, 2009, 17 pgs.

U.S. Appl. No. 12/193,562, Non-Final Office Action mailed Sep. 9, 2009, 5 pgs.

U.S. Appl. No. 10/911,249 Response filed Jul. 29, 2008 to Final Office Action mailed Jan. 29, 2008, 19 pgs.

U.S. Appl. No. 10/911,249 Response filed Jan. 5, 2009 to Final Office Action mailed Dec. 5, 2008, 10 pgs.

U.S. Appl. No. 10/911,249 Response filed Nov. 24, 2008 to Final Office Action mailed Oct. 22, 2008, 25 pgs.

U.S. Appl. No. 10/911,249 Response filed Mar. 11, 2009 to Final Office Action mailed Feb. 9, 2009, 13 pgs.

U.S. Appl. No. 11/054,717 Supplemental Amendment filed Oct. 24, 2008, 8 pgs.

U.S. Appl. No. 11/054,717 Supplemental Amendment filed Sep. 30, 2008, 10 pgs.

U.S. Appl. No. 11/054,717 Non-Final Office action mailed Jan. 9, 2009, 10 pgs.

U.S. Appl. No. 12/193,578 Non-Final Office Action mailed Feb. 11, 2009, 12 pgs.

(56) References Cited

OTHER PUBLICATIONS

U.S. Appl. No. 09/150,983, Final Office Action Aug. 2, 2000, 9 pgs.
U.S. Appl. No. 09/150,983, Non-Final Office Action Jan. 30, 2001, 7 pgs.
U.S. Appl. No. 09/150,983, Non-Final Office Action Apr. 11, 2000, 5 pgs.
U.S. Appl. No. 09/150,983, Non-Final Office Action Dec. 28, 1999, 5 pgs.
U.S. Appl. No. 09/150,983, Notice of Allowance mailed Nov. 19, 2002, 8 pgs.
U.S. Appl. No. 09/150,983, Response filed Feb. 16, 2000 to Non-Final Office Action Dec. 28, 1999, 3 pgs.
U.S. Appl. No. 09/150,983, Response filed Jun. 20, 2000 to Non-Final Office Action mailed Apr. 11, 2000, 7 pgs.
U.S. Appl. No. 09/150,983, Response to Non-Final Office Action filed Aug. 7, 2002, 9 pgs.
U.S. Appl. No. 09/535,937, Non-Final Office Action Nov. 29, 2001, 8 pgs.
U.S. Appl. No. 09/535,937, Notice of Allowance Sep. 10, 2002, 9 pgs.
U.S. Appl. No. 09/535,937, Response filed May 28, 2002 to Non-Final Office Action mailed Nov. 29, 2001, 6 pgs.
U.S. Appl. No. 09/541,845, Final Office Action mailed Nov. 25, 2003, 4 pgs.
U.S. Appl. No. 09/541,845, Non-Final Office Action mailed Apr. 16, 2003, 4 pgs.
U.S. Appl. No. 09/541,845, Notice of Allowance mailed May 4, 2004, 4 pgs.
U.S. Appl. No. 09/541,845, Response filed Mar. 26, 2004 to Final Office Action mailed Nov. 25, 2003, 6 pgs.
U.S. Appl. No. 09/541,845, Response filed Jul. 21, 2003 to Non-Final Office Action mailed Apr. 16, 2003, 6 pgs.
U.S. Appl. No. 09/541,845, Supplemental Notice of Allowability mailed Jan. 26, 2005, 2 pgs.
U.S. Appl. No. 09/661,532, Final Office Action mailed May 20, 2003, 8 pgs.
U.S. Appl. No. 09/661,532, Non-Final Office Action mailed Mar. 1, 2002, 9 pgs.
U.S. Appl. No. 09/661,532, Notice of Allowance mailed Feb. 12, 2004, 4 pgs.
U.S. Appl. No. 09/661,532, Response filed Aug. 20, 2003 to Final Office Action mailed May 20, 2003, 5 pgs.
U.S. Appl. No. 09/661,532, Response filed Aug. 30, 2002 to Non-Final Office Action mailed Mar. 1, 2002, 8 pgs.
U.S. Appl. No. 10/719,220, Non-Final Office Action mailed Sep. 9, 2004, 3 pgs.
U.S. Appl. No. 10/719,220, Preliminary Amendment filed Nov. 21, 2003, 3 pgs.
U.S. Appl. No. 10/911,249, Final Office Action filed Dec. 14, 2006, 3 pgs.
U.S. Appl. No. 10/911,249, Final Office Action filed Dec. 8, 2006, 3 pgs.
U.S. Appl. No. 10/911,249, Final Office Action filed Jul. 26, 2005, 3 pgs.
U.S. Appl. No. 10/911,249, Non-Final Office Action filed Feb. 8, 2005, 5 pgs.
U.S. Appl. No. 10/911,249, Non-Final Office Action filed Mar. 13, 2007, 4 pgs.
U.S. Appl. No. 10/911,249, Non-Final Office Action mailed Sep. 20, 2007, 5 pgs.
U.S. Appl. No. 10/911,249, Preliminary Amendment mailed Aug. 4, 2004, 4 pgs.
U.S. Appl. No. 10/911,249, Response filed Jul. 11, 2007 to Non-Final Office Action Mar. 13, 2007, 11 pgs.
U.S. Appl. No. 10/911,249, Response to Final Office Action filed Jan. 24, 2007, 8 pgs.
U.S. Appl. No. 10/911,249, Response to Final Office Action filed Jan. 30, 2006, 7 pgs.
U.S. Appl. No. 10/911,249, Final Office Action mailed Jan. 29, 2008, 6 pgs.
U.S. Appl. No. 10/911,249, Notice of Allowance mailed Mar. 25, 2008, 4 pgs.
U.S. Appl. No. 10/911,249, Response to Final Office Action filed Feb. 18, 2008, 7 pgs.
U.S. Appl. No. 10/911,249, Response to Non-Final Office Action filed May 6, 2005, 7 pgs.
U.S. Appl. No. 10/911,249, Response to Notice of Non-Compliant Amendment filed Jun. 2, 2005, 6 pgs.
U.S. Appl. No. 10/911,249, Response filed Dec. 18, 2007 to Office Action mailed Sep. 20, 2007, 9 pgs.
U.S. Appl. No. 11/054,717, Final Office Action mailed Jun. 1, 2007, 4 pgs.
U.S. Appl. No. 11/054,717, Non-Final Office Action mailed Oct. 23, 2006, 4 pgs.
U.S. Appl. No. 11/054,717, Non-Final Office Action mailed Sep. 11, 2007, 3 pgs.
U.S. Appl. No. 11/054,717, Preliminary Amendment mailed Feb. 9, 2005, 3 pgs.
U.S. Appl. No. 11/054,717 Response filed Aug. 1, 2007 to Final Office Action mailed Jun. 1, 2007, 6 pgs.
U.S. Appl. No. 11/054,717, Response filed Dec. 5, 2006 to Non-Final Office Action mailed Oct. 23, 2006, 9 pgs.
U.S. Appl. No. 11/054,717, Response to Non-Final Office Action Oct. 10, 2007, 5 pgs.
International Application No. PCT/US99/20823, International Preliminary Examination Report mailed Sep. 19, 2000, 14 pgs.
International Application No. PCT/US99/20823, PCT Search Report mailed Dec. 13, 1999, 7 pgs.
International Application No. PCT/US99/20823, PCT Written Opinion mailed May 16, 2000, 15 pgs.
International Application Serial No. PCT/US00/24633, International Search Report mailed Nov. 30, 2000, 7 pgs.

* cited by examiner

MULTIPLE LAYERED STRUCTURE AND TRANSFER METHOD FOR APPLYING A DESIGN TO FABRIC OR CLOTH

CROSS REFERENCE TO RELATED APPLICATION

The application is a continuation of U.S. application Ser. No. 17/154,339, filed on Jan. 21, 2021, which claims priority to U.S. Provisional Application No. 62/963,846, filed on Jan. 21, 2020, which are hereby incorporated herein in their entirety.

FIELD OF THE INVENTION

The present disclosure relates to the field of printing multiple layer print structures such as including an image or design on footwear, equipment, fabric or cloth, for example.

BACKGROUND OF THE INVENTION

There is a demand for custom printing textiles such as shirts (e.g., tee shirts) having a variety of designs thereon, which have become very popular in recent years. Many shirts are sold with pre-printed designs to suit the tastes of consumers. In addition, many customized tee shirt stores are now in the business of permitting customers to select designs or decals of their choice. Processes have also been proposed which permit customers to create their own designs on transfer sheets for application to tee shirts by use of a conventional hand iron, such as those described in U.S. Pat. No. 4,244,358. Furthermore, U.S. Pat. No. 4,773,953, is directed to a method for utilizing a personal computer, a video camera or the like to create graphics, images, or creative designs that can be put on a fabric. These designs may then be transferred to the fabric by way of an ink jet printer, a laser printer, or the like.

Other types of heat transfer sheets are known in the art. For example, U.S. Pat. No. 5,798,179 is directed to a printable heat transfer material using a thermoplastic polymer such as a hard acrylic polymer or poly (vinyl acetate) as a barrier layer, and has a separate film-forming binder layer. U.S. Pat. No. 5,271,990 relates to an image-receptive heat transfer paper which includes an image-receptive melt-transfer film layer comprising a thermoplastic polymer overlaying the top surface of a base sheet. U.S. Pat. No. 5,502,902 relates to a printable material comprising a thermoplastic polymer and a film-forming binder. U.S. Pat. No. 5,614,345 relates to a paper for thermal image transfer to flat porous surfaces, which contains an ethylene copolymer or an ethylene copolymer mixture and a dye-receiving layer.

Other examples of heat transfer materials are disclosed in, for example, U.S. Pat. No. 6,410,200 which relates to a polymeric composition comprising an acrylic dispersion, an elastomeric emulsion, a plasticizer, and a water repellant. U.S. Pat. No. 6,358,660 relates to a barrier layer. The barrier layer of U.S. Pat. No. 6,358,660 provides for “cold peel,” “warm peel” and “hot peel” applications and comprises thermosetting and/or ultraviolet (UV) curable polymers. U.S. application Ser. No. 09/980,589, filed Dec. 4, 2001, relates to a transferable material having a transfer blocking overcoat and to a process using said heat transferable material having a transfer blocking overcoat.

Some of the above-mentioned applications contain specific systems for forming clear images which are subsequently transferred onto the receptor element. However, other heat transfer systems exist, for example, those disclosed by U.S. Pat. Nos. 4,021,591, 4,555,436, 4,657,557, 4,914,079, 4,927,709, 4,935,300, 5,322,833, 5,413,841, 5,679,461, 5,741,387, and 6,432,514.

The cited prior art reference (U.S. Pat. No. 5,465,760A) relates to a multi-axial, three-dimensional fabric formed from five yarn systems. The yarn systems included wrap yarn arranged in parallel with the longitudinal direction of the fabric and a first pair of bias yarn layer positioned on the front surface of the wrap yarn and a second pair of bias yarn layer positioned on the back surface of the warp yarn and relates to three-dimensional woven fabric formed of warp, weft and vertical yarns, and more particularly to a three-dimensional woven fabric incorporating a pair of bias yarn layers on the front surface and a pair of bias yarn layers on the back surface of the woven fabric for enhanced in-plane shear strength and modulus vis-a-vis conventional three-dimensional fabric, and also to a method for producing the fabric. Vertical yarn is arranged in a thickness wise direction of the fabric in a perpendicularly intersecting relationship to the warp yarns. Weft yarns are arranged in the widthwise direction of the fabric and in a perpendicularly intersecting relationship to the warp yarns so as to provide a multi-axial, three-dimensional fabric with enhanced resistance to in-plane shear.

The cited prior art reference (WO2004000049A1) relates to a multi-layered fabric that is particularly suitable for making sports garments. The fabric is characterized in that it includes: a first layer including cellulosic fibers that can be used to form the inside face of a garment; a second layer made entirely from non-cellulosic fibers, the second layer being positioned relative to the first layer such that liquid is able to be transferred from the first layer to the second layer, wherein the fibers of the second layer have a surface energy greater than the surface energy of the fibers of the first layer. There is provided a multi-layered fabric including: a first layer suitable for forming the inside face of a garment, the first layer having at least 90% cellulosic fibers; and a second layer made entirely from non-cellulosic fibers, the second layer being positioned relative to the first layer such that liquid is able to be transferred from the first layer to the second layer; wherein the fibers of the second layer have a surface energy greater than the surface energy of fibers of the first layer. The fibers of the second layer therefore have a greater affinity for liquid than the first layer such that the wicking gradient of the fabric increases from the first layer to the second layer and thereby draws sweat away from the person wearing a garment made from the fabric.

The cited prior art reference (U.S. Pat. No. 8,940,387B2) comprises a disposable carrier film onto which a release layer and PU inks are printed using layering techniques. The ink layers can be multi-colored, and each color is applied sequentially using a conventional screen-printing method. A back-up layer, a lacquer layer, and an adhesive layer are printed in sequence over the ink layers. The ink includes reflective particles providing the optical effect of a 3-dimensional appliqué. The artwork is created by overlapping design layers to controlled specification sequences. This is achieved by way of ink layering techniques and/or incorporation of additives such as reflective particles in an ink and/or non-planar configuration of a substrate and/or incorporation of a textile insert to provide physically different depths, and/or deposition of ink and flock of different or similar depths alongside each other in a pattern. The ink, because of the additives, creates a desired color tone, and this may be enhanced by layering the ink in an overlapping region. Thus, there are three main regions, namely a central region with reflective ink, a "shoulder" region with overlapping matt and reflective inks and an outer region with only matt ink.

The cited prior art reference (U.S. Pat. No. 8,993,061B2) relates to a three-dimensional printing directly onto an article of apparel. Disclosed is a method and system for direct three-dimensional printing onto an article of apparel, including designing a three-dimensional pattern for printing onto the article, positioning at least a portion of the article on a tray in a three-dimensional printing system, the portion being positioned substantially flat on the tray, printing a three-dimensional material directly onto the article using the designed pattern, curing the printed material, and removing the article from the three-dimensional printing system. The methods and systems for 3D printing and assembly of an article of footwear include having an upper that includes 3D printing directly onto the upper material. In particular, an exemplary method is disclosed for 3D printing directly onto a fabric material, which allows building of a structure on the fabric for use in apparel applications. The disclosed methods and systems may use any suitable 3D printing system.

The cited prior art reference (WO2009032868A1) relates to nonwoven fabric composites comprising layers of spun bond and melt blown nonwoven webs. Such composites are prepared by forming or assembling the layers of the composite such that there is at least one outer layer of spun bond fibers disposed on at least one inner melt blown layer. The at least one outer layer comprises substantially parallel stripes of spun bond, continuous filament fibers with at least two different types of stripes being used. The stripes of fibers within the spun bond layer(s) are also predominately oriented in the machine direction of the nonwoven fabric composite. such nonwoven fabric composites comprise: a) at least one inner layer comprising melt blown fibers; and b) at least one outer layer disposed on one side of the at least one inner layer. The outer layer(s) is/are fashioned from spun bond, continuous filament fibers comprising different fibers formed from at least two different types of polymeric material. All layers of the fabric composites herein are bonded together via thermal, adhesive, ultra-sonic or mechanical bonding means. Such composites can be fashioned to vary the ratio of cross direction stretch to machine direction stretch.

The cited prior art reference (U.S. Pat. No. 9,005,710B2) relates to methods and systems for apparel assembly using three-dimensional printing directly onto fabric apparel materials. Disclosed is a method and system for direct three-dimensional printing and assembly of an article of apparel, including designing a three-dimensional pattern for printing, positioning at least a portion of the article on a tray in a three-dimensional printing system, the portion being positioned substantially flat on the tray, printing a three-dimensional material directly onto the article using the designed pattern, curing the printed material, and removing the article from the three-dimensional printing system. The methods and systems for 3D printing and assembly of an article of footwear having an upper that includes 3D printing directly onto at least a first portion of an upper material and a sole formed by 3D printing onto at least a second portion of the upper material. In particular, an exemplary method is disclosed for 3D printing directly onto a fabric material, which allows building of a structure on the fabric for use in apparel applications. The disclosed methods and systems may use any suitable 3D printing system.

A hybrid process involving screen printing in conjunction with direct to garment printing has been disclosed in US Pat. No. 10,131,160. As stated in the document, the direct to garment (DTG) process utilizing the inkjet print-heads could be slow and thus be economically disadvantageous for longer runs. Therefore, in order to overcome the limitations of DTG, a process has been disclosed where white or underbase layers are printed by a screen-printing process followed by printing an image using a DTG printer. The disclosed process would still require additional steps for creating the silk-screen for each custom print job, which would result in additional expense and time. U.S. Pat. No. 10,532,585 also refers to the image quality and production speed challenges with direct-to-garment applications.

Problems with many known transfer sheets include the expense involved in coating layer upon layer of different solutions onto a support material. The repetition of the multi-step process increases the print time. Thus, there is a need in the art for an effective, and efficient method for printing.

BRIEF SUMMARY OF THE INVENTION

The present disclosure, in one embodiment, includes the steps of selecting a design or image in step and printing a multiple layered print structure for the image or design in step to apply the design or image to fabric or cloth. The illustrated process including the step of printing the multiple layered print structure simplifies the process for printing a design or image on fabric or cloth.

In the embodiment, the structure includes one or more print layers printed on substrate and an adhesive layer deposited on the print layer(s). The one or more print layer(s) and adhesive or resin layer are deposited on the substrate in a pre-set pattern to form the shape profile for the design or image. Print layer(s) includes inks or dyes or toners for printing the print features and/or background color(s) of the image or design. In the illustrated embodiment, the ink is combined with a binder material to form the print layer(s). Illustrative binder materials include, but are not limited to, polyurethane, or polymer particles such as polyolefin, polyamide, and polyester particles, and/or co-polymer blends. The inks or dyes can be mixed with the binder material or the materials can be deposited as separate layers.

The multiple layered print structure as described is created by a printing apparatus using a digital print pattern to deposit multiple layers of the multiple layered structure in the pre-set pattern to form the shape profile and print features. In the embodiment printing apparatus includes a plurality of print heads to deposit the layers of the multiple layered structure on substrate. As shown, the substrate is movable along a feed path in the x-direction as illustrated by arrow via an x-axis drive assembly. As shown, the heads are spaced along the feed path to sequentially deposit the layers of the multiple layered structure on the substrate as the substrate moves past the heads via operation of the x-axis drive assembly. Heads move crosswise relative to the feed path of the substrate as illustrated by arrow to deposit material across a width of the substrate via operation of a y-drive assembly.

In alternate embodiments of the printing apparatus for printing the multiple layered printing structure, the printing apparatus includes one or more rotating photosensitive drums for depositing one or more layers of the multiple layered structure. In the embodiment, the printing apparatus includes multiple drums for depositing the adhesive, receptive layer, opaque layer, printing ink layer and/or any additional optional release layer or other layer(s) based upon the digital print pattern. A charged pattern or differentially charged image is applied to the drums through a laser device or other operating mechanism to collect charged powder or ink and transfer the powder or ink image to the substrate. In alternate embodiments, the printing apparatus uses liquid electrophotography printing processes and machines such as machines available from HP Indigo of HP Inc of Palo Alto California. In the embodiment shown, a separate drum is used to apply charged adhesive powder, receptive, opaque and printing ink powders or other materials, however in alternate embodiments one or more of the multiple layers or powders are combined and deposited on a single drum.

In embodiments, the multiple layers of the multiple layered print structure are deposited on a substrate having a base layer and a release layer or coating to transfer the multiple layered print structure to a fabric or cloth item. Illustrative base layers are formed of a material capable of withstanding high temperatures and which can handle multiple print layers and coatings as described. Suitable base layers include a paper web, plastic film, wood pulp fiber paper, metal foil, parchment paper, lithographic printing paper, clear film or similar materials. The release layer or coating is applied to the base layer of the substrate to facilitate separation of the multiple layered print structure from the substrate for image transfer. Illustratively the release layer or coating is a silicone coating or wax-based or other material that releasably adheres the multiple layered print structure to the base layer of the substrate for application to fabric or cloth item.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the disclosure will be better understood from the following description taken in conjunction with the accompanying Figures, in which:

FIGS. 2A-B illustrate a, in accordance with one embodiment.

DETAILED DESCRIPTION

The present invention includes in some embodiments a multilayer print structure that may include one or more layer(s) printed utilizing a combination of digital printing processes. The combination of multiple digital printing technologies such as laser, inkjet, liquid electrophotography, for example offer the advantage of printing layer(s) at a faster pace than prior art printing techniques. Upon combining one or more of these above-stated processes alongwith inkjet printing, multilayer layered print structures can be created digitally while eliminating the steps needed for conventional printing such as silk-screen. The structure includes in some embodiments one or more print layers printed on a substrate and an adhesive layer deposited on the print layer(s). The one or more print layer(s) and adhesive or resin layer may be deposited on the substrate in a pre-set pattern to form the shape profile for the design or image. Print layer(s) may include inks or dyes for printing the print features and/or background color(s) of the image or design. The ink may be combined with a binder material to form the print layer(s) in some embodiments. Illustrative binder materials include, but are not limited to, a polyurethane binder or polymer particles such as polyolefin, polyamide, and polyester particles, and/or co-polymer blends. In some embodiments, the present application includes the steps of selecting a design or image for printing and printing a multiple layered print structure for the image or design on a transfer substrate and thereby transferring it onto fabric or cloth. The illustrated process may include the step of printing the multiple layered print structure utilizing a combination of digital printing processes to simplify the process for printing a design or image on fabric or cloth, in some embodiments.

Figure 1A:
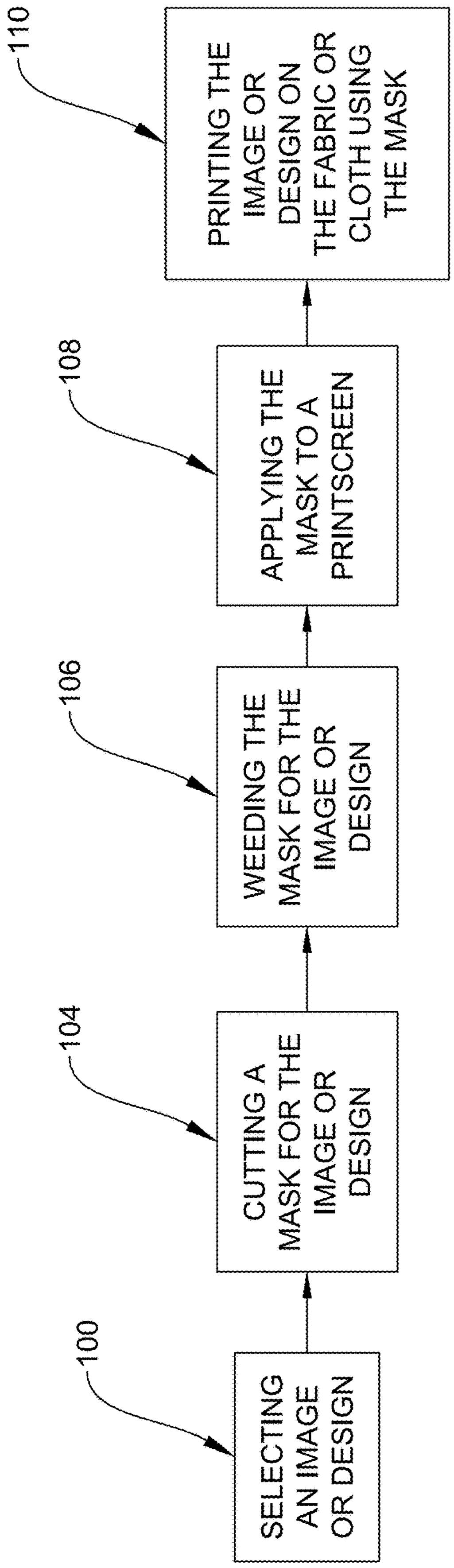
FIG. 1A illustrates process steps for printing an image or design on fabric or cloth of the prior art.
Figure 1B:
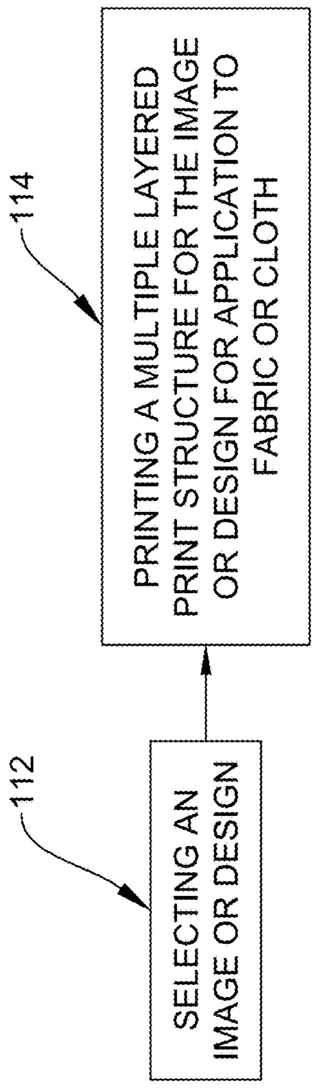
FIG. 1B illustrates steps of an illustrative embodiment of the present application for applying an image or design to fabric or cloth.

There is a demand for custom printed t-shirts and novelty items. Screen printing techniques used by custom printers include multiple steps which can be time and labor intensive. For example, as shown in FIG. 1A, custom printing typically involves selecting a design or image as illustrated by step 100. A mask is cut for the selected design or image as illustrated in cutting step 104 and the mask is weeded as shown in weeding step 106. As shown in step 108, the mask is applied to a print screen or other device and the mask is used to print the image or design on fabric or cloth as shown in step 110. For complex designs and color schemes, the process involves multiple masking, screen preparation and printing steps. Methods such as application and exposure of photosensitive emulsions could also be employed for silk-screen preparation. In contrast, in some embodiments of the present application as shown in FIG. 1B, the process may include the steps of selecting a design or image as shown in step 112 and printing a multiple layered print structure for the image or design as shown in step 114 to apply the design or image to fabric or cloth, for example. The illustrated process including the step of printing the multiple layered print structure simplifies the process for printing a design or image on fabric or cloth.

Figure 2A:
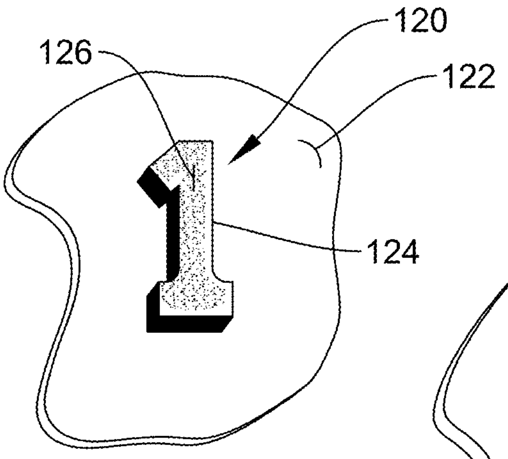
FIG. 2A illustrates an embodiment of a multiple layered print structure having a shape profile and print feature for an image or design.
Figure 2B:
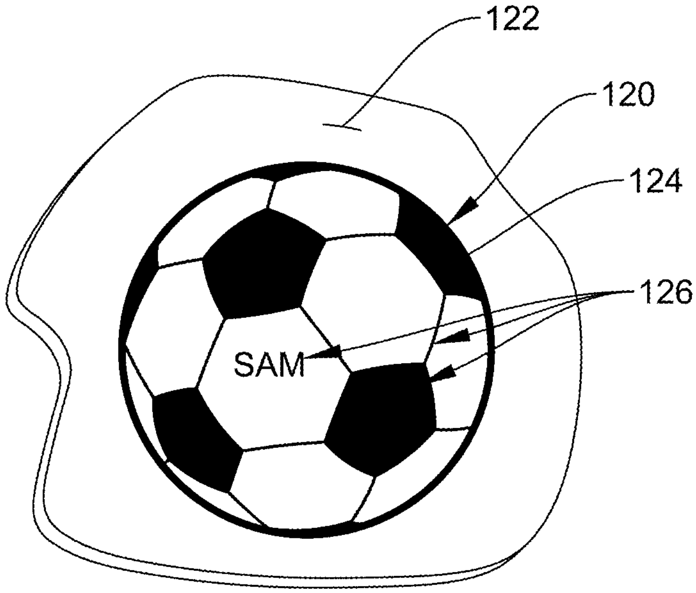
FIG. 2B illustrates an embodiment of a multiple layered print structure having a shape profile and plurality of print features.

FIG. 2A illustrates an embodiment of a multiple layered print structure 120 for a selected design or image of the present application. As shown, the multiple layered print structure 120 is formed on substrate 122 and includes a shape profile 124 corresponding to a shape of the desired image or design and one or more print features 126. In the embodiment shown in FIG. 2A, the shape profile 124 is a "1" shape and the print feature 126 provides a background color or pattern. In an alternate embodiment, the multiple layered print structure 120 has a round shape profile 124 and a plurality of print features 126 including a quilted pattern of a soccer ball and the name "SAM". While FIGS. 2A-2B illustrate example shape profiles 124 and print feature 126 applications, the present application is not limited to any particular shape or number or type of print features or profiles for the multiple layered print structure 120.

Figures 3A, 3B, 3C, 3D, 3E, 3F, 3G, 3H:
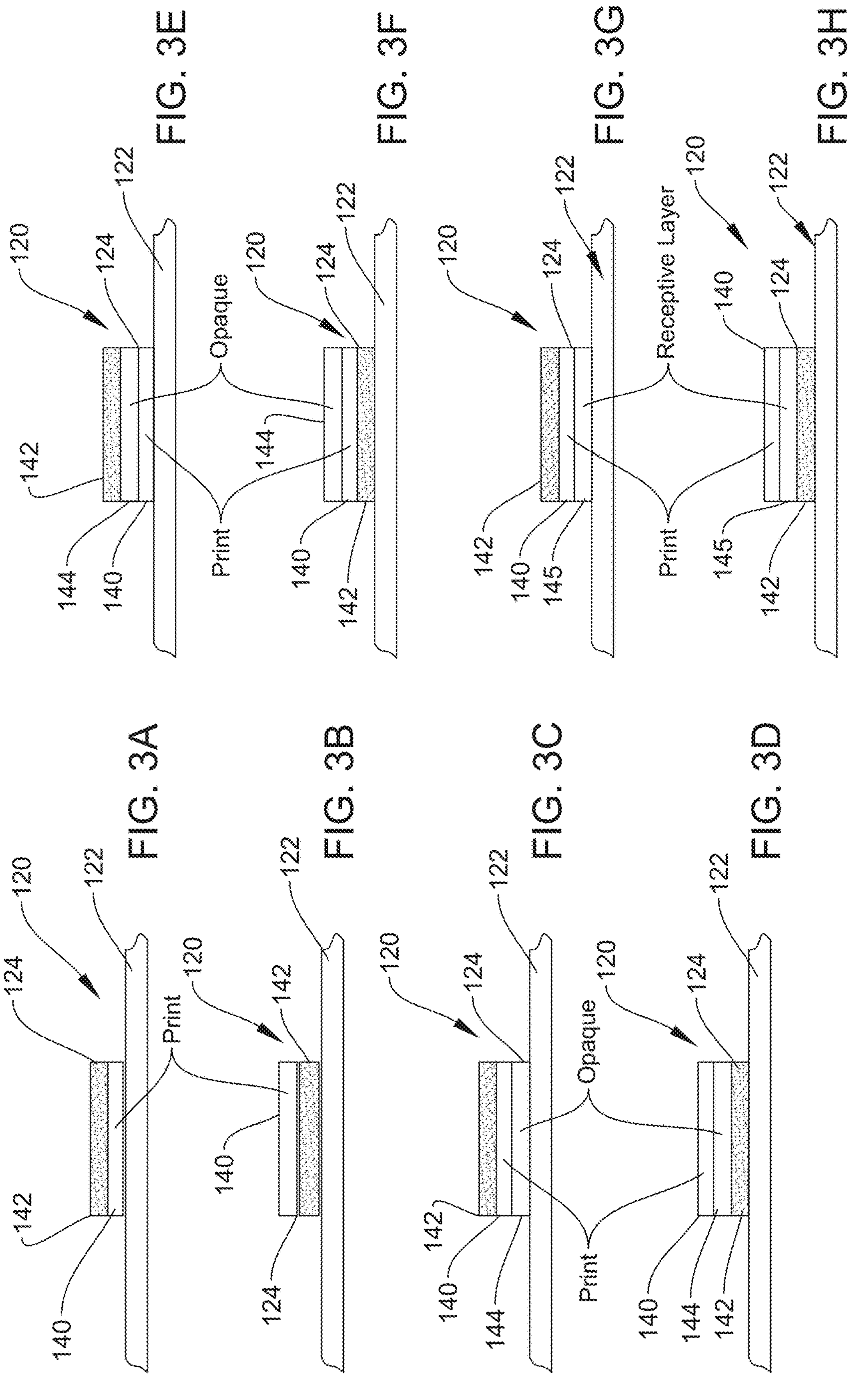
FIGS. 3A-3P illustrate embodiments of the multiple layered print structures of the present application.
Figures 3I, 3J, 3K, 3L, 3M, 3N, 3O, 3P:
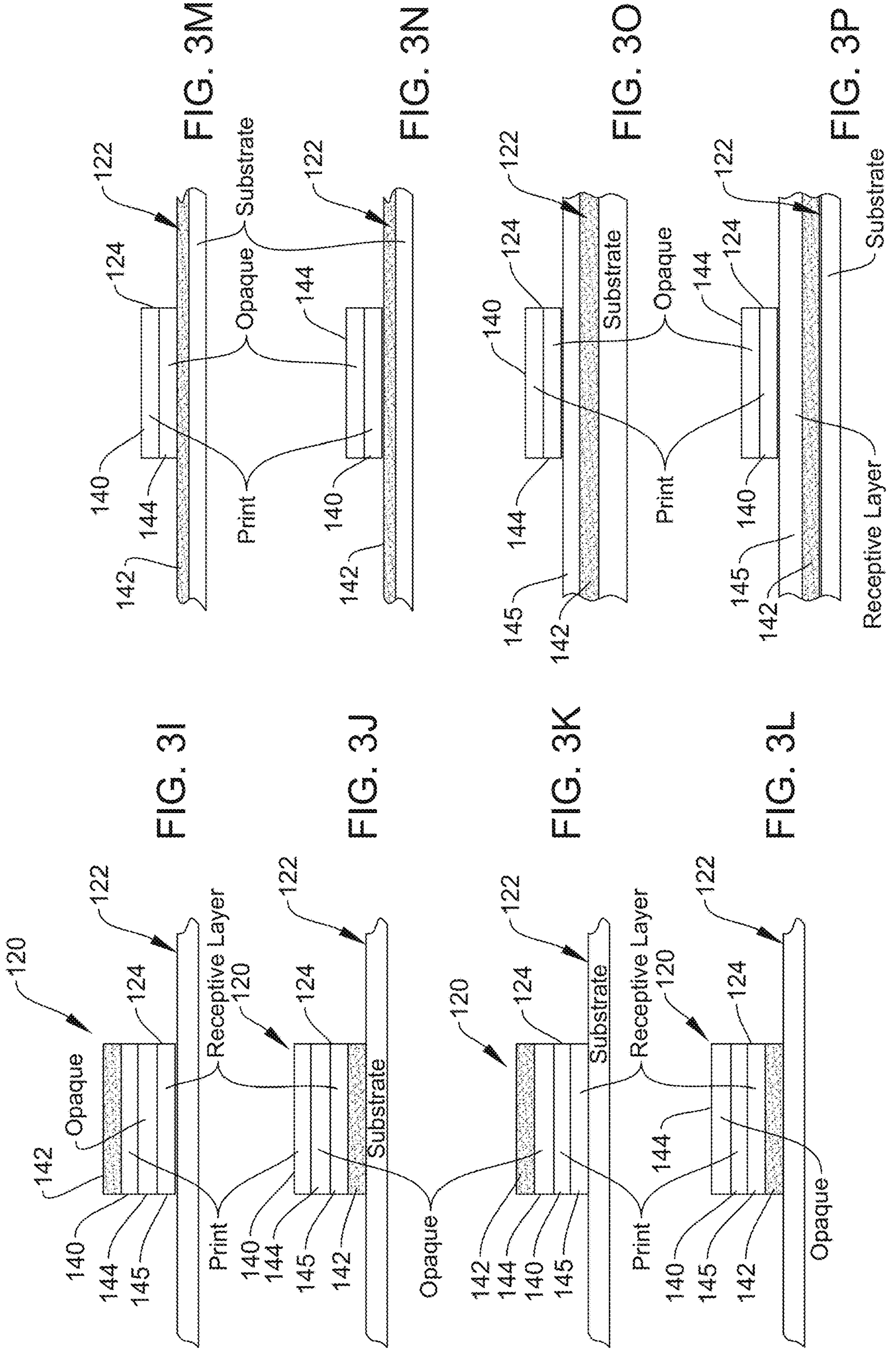

FIGS. 3A-3P illustrate embodiments of the multiple layered print structures 120 of the present application. In the embodiment shown in FIG. 3A, the structure 120 includes one or more print layers 140 (only one illustrated in FIG. 3A) printed on substrate 122 and an adhesive layer 142 deposited on the print layer(s) 140. The one or more print layer(s) 140 and adhesive or resin layer 142 are deposited on the substrate 122 in a pre-set pattern to form the shape profile 124 for the design or image. Print layer(s) 140 includes inks or dyes for printing the print features and/or background color(s) 126 of the image or design. In the illustrated embodiment, the ink is combined with a binder material to form the print layer(s) 140. Illustrative binder materials include, but are not limited to, a polyurethane binder or polymer particles such as polyolefin, polyamide, and polyester particles, and/or co-polymer blends. The inks or dyes can be mixed with the binder material or the materials can be deposited as separate layers (not shown).

As shown in FIG. 3A, the adhesive layer 142 is deposited on the print layer(s) 140 to correspond to the shape profile 124 of the image or design. Illustrative adhesives include, but are not limited to, thermoplastic polymers such as polyamide, polyolefin, polyester and other copolymer and mixtures thereof that are adhereable to cloth or fabric, for example. Other adhesives include, but are not limited to, ethylene copolymer, ethylene acrylic acid, ethylene methacrylic acid and/or ethylene-vinyl acetate. Adhesives may also include one or more of pressure-sensitive adhesives (PSA), ultra-violet (UV) cured adhesives, electro-beam (EB) cured adhesives, water-activated adhesives, spray adhesives and/or powder adhesives, for example. The PSA may include one or more of permanent and removable adhesive compositions. The adhesive layer could also comprise multiple layers deposited using one or more adhesive combinations while utilizing one or more printing processes. In an illustrative embodiment, an additional adhesive receptive layer may be deposited prior to depositing the powder adhesive. The powder adhesive may also be deposited or sprinkled or sprayed inline or offline while the previously deposited layer is still in a wet or tacky state. The powder adhesive adheres to this wet/tacky layer to create a shape profile, while the additional powder is removed from the non-image areas by shaking/agitation, vacuum, blowing, other mechanical processes, for example. Powder adhesive could also be applied while utilizing a mechanical powder adhesive coater/applicator, for example. Upon application of the adhesive, the layers may be cured using an inline or offline curing assembly. Illustrative adhesive receptive layers include, but are not limited to one or more polymers, copolymers or mixtures thereof. Examples of such polymers include, but are not limited to, acrylic polymer, acrylate polymer, polyester, polyvinyl alcohol, poly vinyl pyrollidone, poly vinyl chloride, poly vinyl acetate, polyurethane, vinyl acetate, styrene-butadiene polymer, styrene-acrylate, ethylene copolymer, ethylene acrylic acid, ethylene methacrylic acid, and/or ethylene-vinyl acetate.

In an alternate embodiment shown in FIG. 3B, the adhesive layer 142 is deposited on substrate 122 and the print layer(s) 140 is deposited on the adhesive layer 142. As previously described, both layers may be deposited in the pre-set pattern to form the shape profile 124 and the print layer(s) 140 form the print features 126 as described. FIG. 3C illustrates another embodiment of layers of the print structure 120 for use with dark fabric or cloth including an opaque layer(s) 144 printed on the substrate 122. The opaque layer 144 is used to obscure a dark pigment or dark colored fabric so that the print layer(s) 140 is visible. The opaque layer 144 comprises an opaque or white pigment in a binder material(s) such as polyurethanes, polyesters, styrene-butadiene polymers, acrylate polymers, styrene-acrylate polymers, acrylic polymers, ethylene-vinyl acetate copolymers, ethylene methacrylate acid copolymers, and/or ethylene-acrylic acid copolymers. Examples of suitable white pigments include silica, alumina, titanium dioxide, zinc sulfide, zinc oxide, antimony oxide, barium sulfate, calcium carbonate and the like or other materials that obscure dark pigments. The opaque layer as well as other printing layers may also include other additives such as wetting agents, defoamers, anti-foaming agents, humectants, rheology modifiers, surfactants, and/or dispersants, for example. The opaque layer could be deposited in one or more layers through one or more printing processes.

In the embodiment shown in FIG. 3C, the print layer(s) 140 is deposited on the opaque layer 144 and the adhesive layer 142 is deposited on the print layer(s) 140. In another embodiment shown in FIG. 3D, adhesive layer 142 is deposited on the substrate 122 and opaque layer 144 is deposited on adhesive layer 142. Print layer(s) 140 as shown is deposited on opaque layer 144 to form the multiple layered print structure 120. In the embodiment illustrated in FIG. 3E, the print layer(s) 140 is deposited on the substrate 122, and the opaque layer 144 is deposited on the print layer(s) 140. The adhesive layer 142 is deposited over the opaque layer 144 as shown. In the embodiment shown in FIG. 3F, the adhesive layer 142 is deposited on the substrate 122 and the print layer(s) 140 is deposited on the adhesive layer 142 and the opaque layer 144 is deposited on the print layer(s) 140.

FIGS. 3G-3H illustrate embodiments of a multiple layered print structure 120 including adhesive layer 142 and print layer(s) 140 deposited on the substrate 122 and FIGS. 3I-3L illustrate a multiple layered print structure 120 including adhesive layer 142, opaque layer 144 and print layer(s) 140 deposited on substrate 122 as shown. In each of the embodiments shown in FIGS. 3G-3I, the multiple layered structure includes a receptive layer 145 for depositing the print layer(s) 140 in FIGS. 3G-3H and print and opaque layers 140, 144 in FIG. 3I-3L. Illustrative print receptive layers 145 include one or more of acrylic polymer, polyvinyl alcohol, poly vinyl pyrrolidone, poly vinyl acetate, polyurethane, styrene-butadiene polymer, styrene-acrylate polymer, vinyl acetate, ethylene copolymer, acid groups, ethylene acrylic acid, ethylene methacrylic acid or ethylene-vinyl acetate, for example. In illustrative embodiments, the print receptive layer(s) 145 also includes pigments such as, but not limited to silica, alumina, calcium carbonate, wax-modified pigments, and the like.

In the embodiments shown in FIGS. 3G, 3I and 3K, the receptive layer 145 is deposited on the substrate 122 and the opaque and print layer(s) 140, 144 are deposited on the receptive layer 145 in FIGS. 3I-3K and the print layer(s) 140 are deposited on the receptive layer 145 in FIG. 3G. In the embodiments shown in FIGS. 3H, 3J and 3L, the receptive layer(s) 145 is deposited on the adhesive layer 145 and the opaque and print layer(s) 140, 144 are deposited on the receptive layer in FIGS. 3J and 3L and the print layer(s) 140 are deposited on the receptive layer 145 in FIG. 3H. As shown in each of the illustrated embodiments of FIGS. 3G-3L, the adhesive 142, print layer(s) 140 and receptive layer 145 are deposited in the pre-set pattern to form the shape profile 124 and the one or more print features 126. In alternate embodiments shown in FIGS. 3M-3N, the adhesive layer 142 is deposited on the substrate 122 and the print layer(s) 140 and opaque layer 144 is formed on the adhesive layer in the pre-set pattern or shape profile 124. In the embodiments illustrated in FIGS. 3O and 3P, the adhesive layer 142 and receptive layer 145 are deposited on the substrate 122 and the print and opaque layers 140, 144 are deposited on the receptive layer 144 in the preset pattern or profile 124.

Figure 4A:
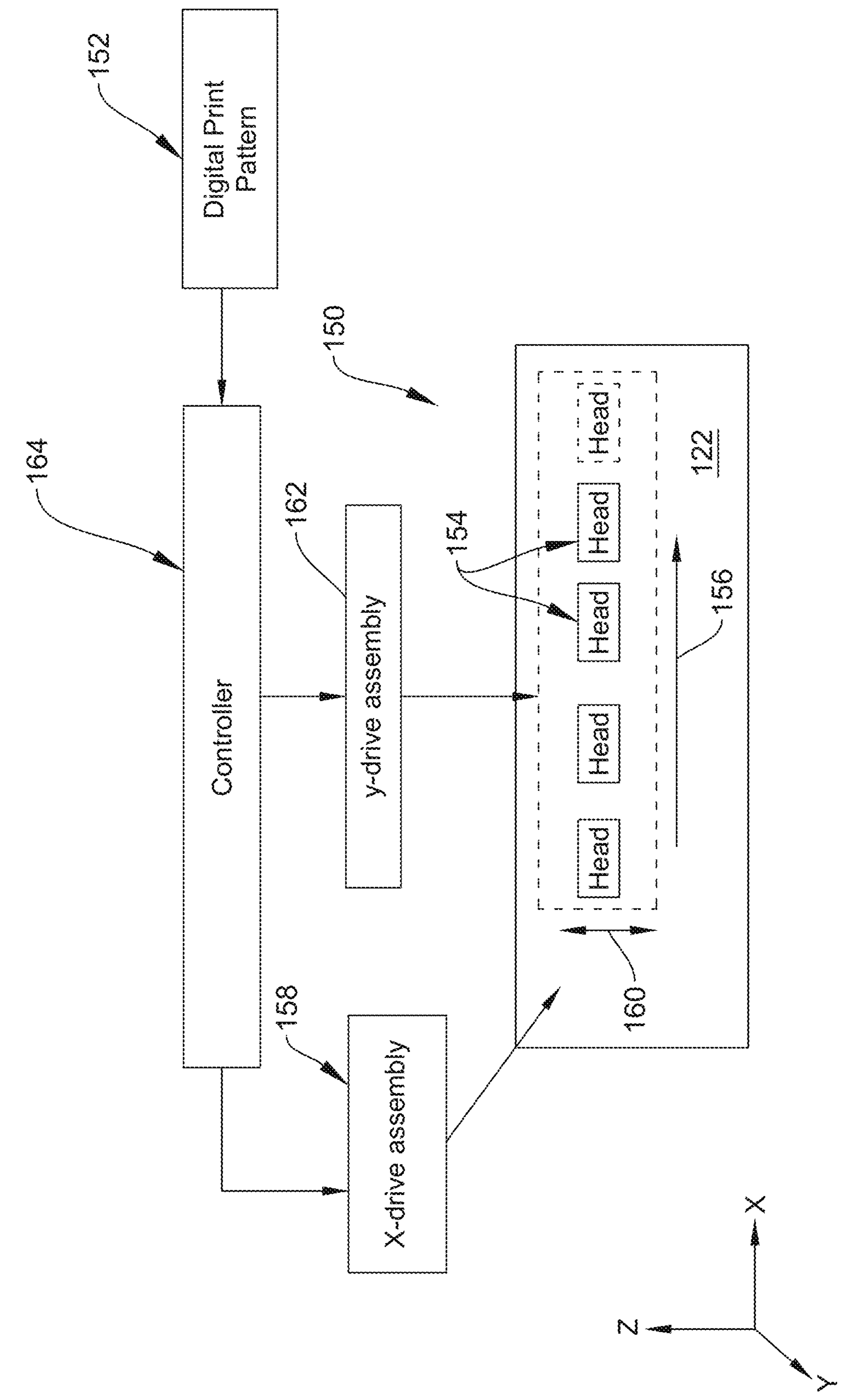
FIG. 4A is a schematic illustration of a top view of a printing apparatus for printing multiple layers of the multiple layered print structure of the present application.
Figure 4B:
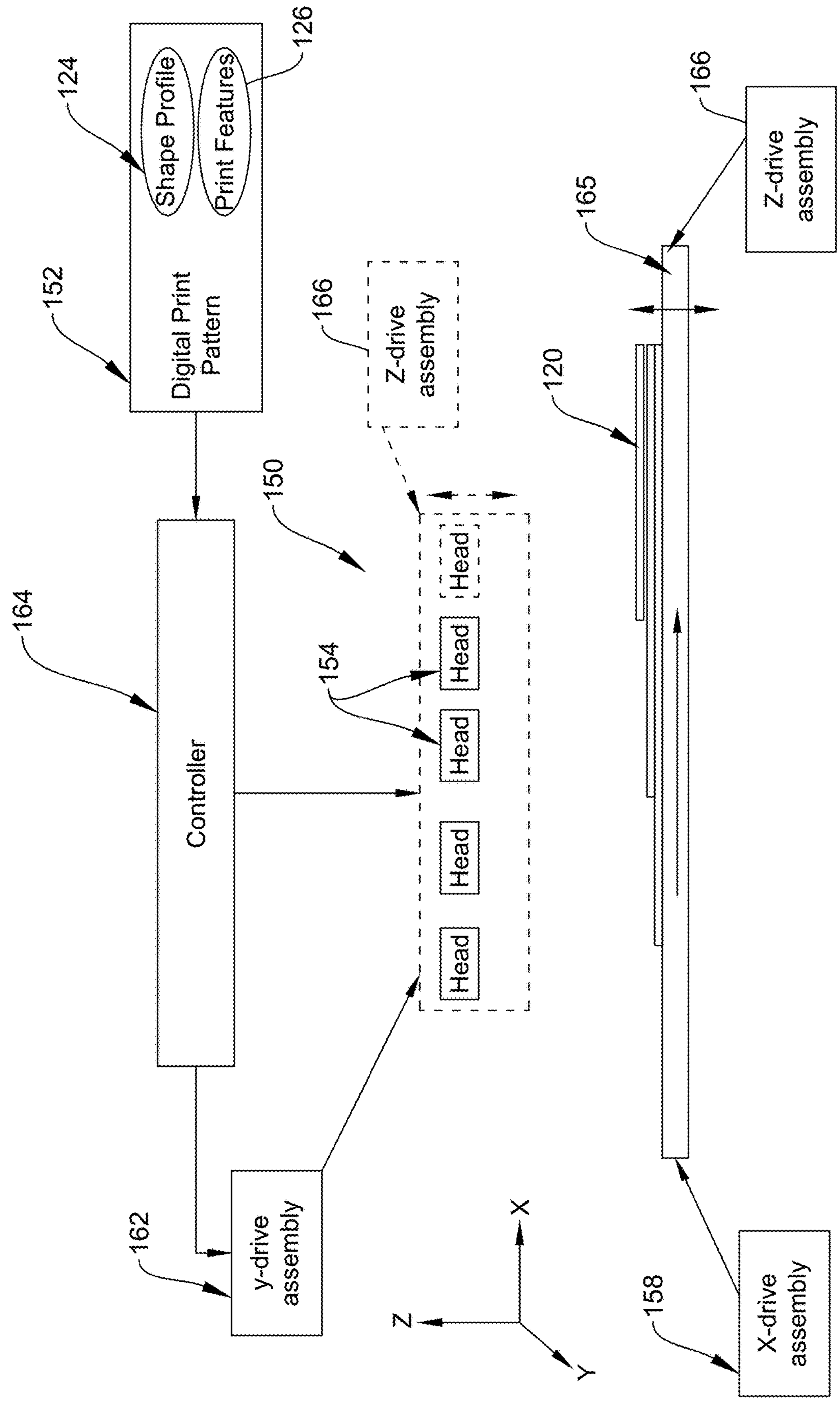
FIG. 4B is a schematic illustration of another embodiment of a printing apparatus including a plurality of printing heads.

The multiple layered print structure 120 as described may be created by a printing apparatus 150 using a digital print pattern 152 to deposit multiple layers of the multiple layered structure 120 in the pre-set pattern to form the shape profile 124 and print features 126. FIGS. 4A-4B illustrate an embodiment of printing apparatus 150 including a plurality of print heads 154 to deposit the layers of the multiple layered structure 120 on substrate 122. As shown, the substrate 122 is movable along a feed path in the x-direction as illustrated by arrow 156 via an x-axis drive assembly 158 (illustrated schematically). As shown, the heads 154 are spaced along the feed path to sequentially deposit the layers of the multiple layered structure 120 on the substrate 122 as the substrate 122 moves past the heads 154 via operation of the x-axis drive assembly 158. Heads 154 move crosswise relative to the feed path of the substrate 122 as illustrated by arrow 160 to deposit material across a width of the substrate 122 via operation of a y-drive assembly 162.

Operation of the x-drive and y-drive assemblies 158, 162 is controlled via controller 164. The controller 164 includes various hardware and software components to generate control signals to operate the drive assemblies 158, 162 to position the heads 154 to form the multiple layered print structure 120 for the image or design.

As shown in FIG. 4B, the printing apparatus includes substrate platform 165 movable via x-drive assembly 158 and a plurality of heads 154 movable relative to the substrate platform 165 via y drive assembly 162 as schematically shown. The printing apparatus 150 also includes a z-drive assembly 166 to adjust spacing between the print head(s) 154 and the substrate platform 165 to provide close spacing between the heads 154 and substrate 122 for printing and compensate for spacing changes between the substrate 122 and the heads 154 as layers are added to the substrate 122. The z-drive assembly is coupled to one or both of the head(s) 154 or substrate platform 165 to adjust spacing for printing the multiple layered print structure 120. Thus, as described in FIGS. 4A-4B, substrate 122 is moved along the x-axis as illustrated by arrow 156 and heads 154 move crosswise along y axis as illustrated by arrow 160 to provide an x-y bi-directional print pattern for fabricating the multiple layered print structure 120.

Figure 4D:
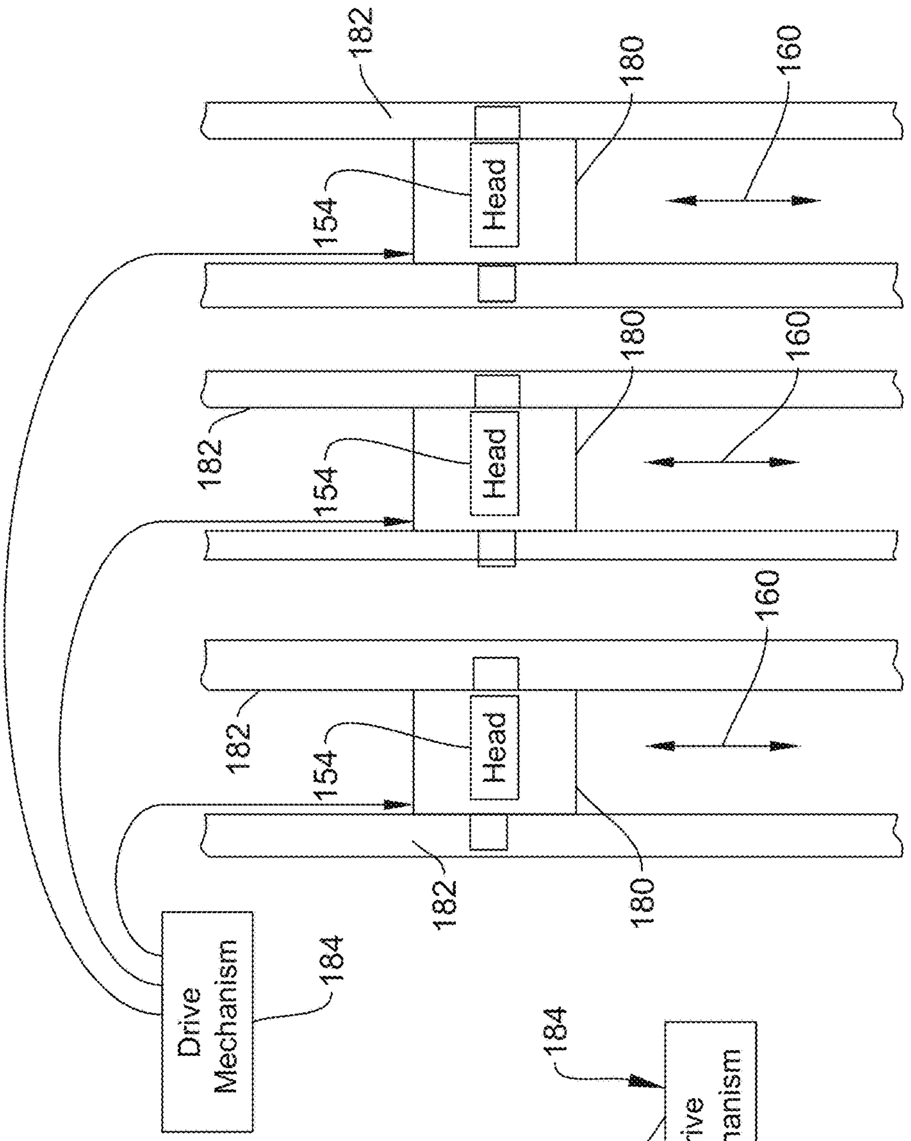
FIG. 4D illustrates a printing apparatus including a plurality of movable carriages for a plurality of print heads of the printing apparatus.
Figure 4C:
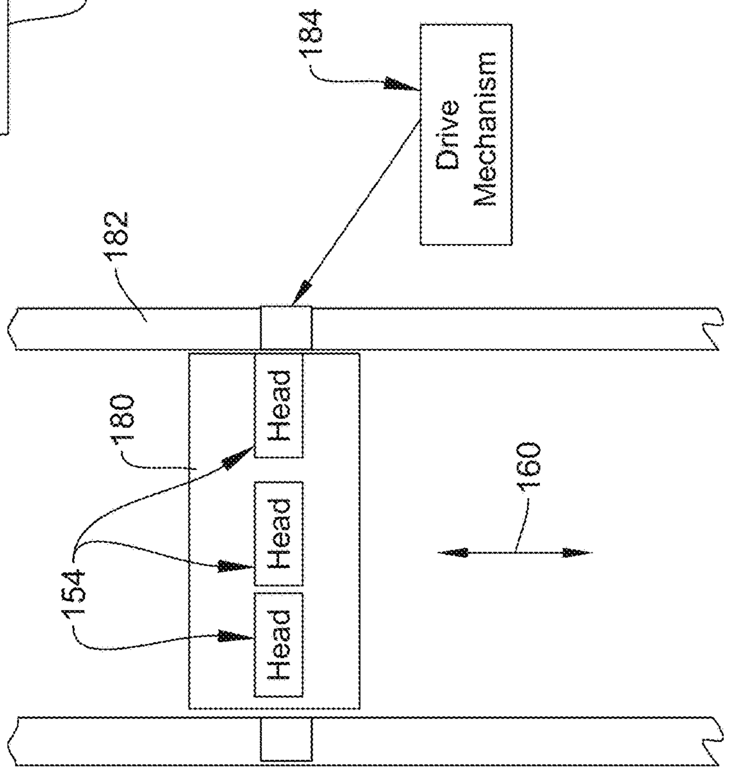
FIG. 4C illustrates a carriage assembly including a movable carriage for a plurality of print heads of the printing apparatus.

Heads 154 move crosswise as illustrated by arrow 160 via operation of y-drive assembly 162 as previously described. In an illustrated embodiment, heads 154 are coupled to a carriage assembly which includes one or more carriages 180 moveable along a track or rail 182 via operation of a linear drive actuator or mechanism 184 under control of controller 164. Illustrative drive mechanisms 184 include drive belts, drive motors and other electrical or electro-magnetic drive device to move the carriage 180 along track or rail 182. In the embodiment shown in FIG. 4C, the carriage 180 includes multiple heads 154. In an alternate embodiment shown in FIG. 4D, the assembly includes multiple carriages to provide a separate carriage 180 for each of the heads 154. As shown heads 154 are coupled to separate carriages 180 for crosswise movement as illustrated by arrow 160.

Figure 4F:
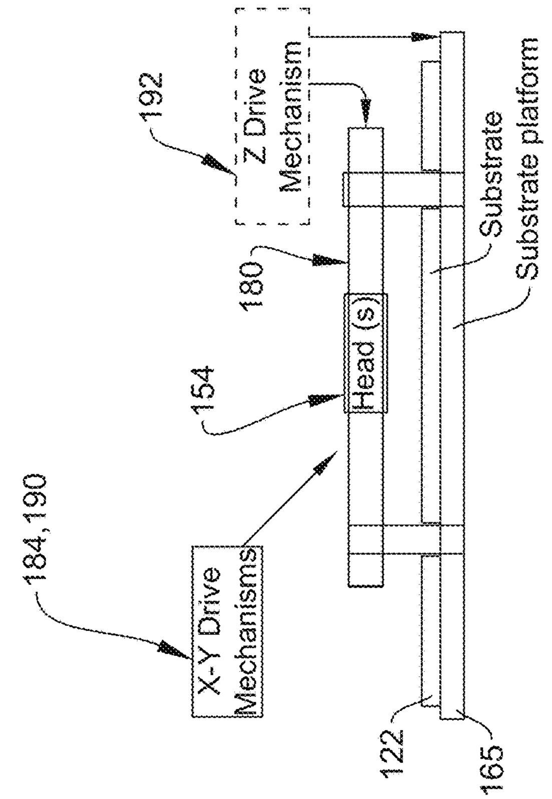
FIG. 4F is a side view of the embodiment illustrated in FIG. 4E.
Figure 4E:
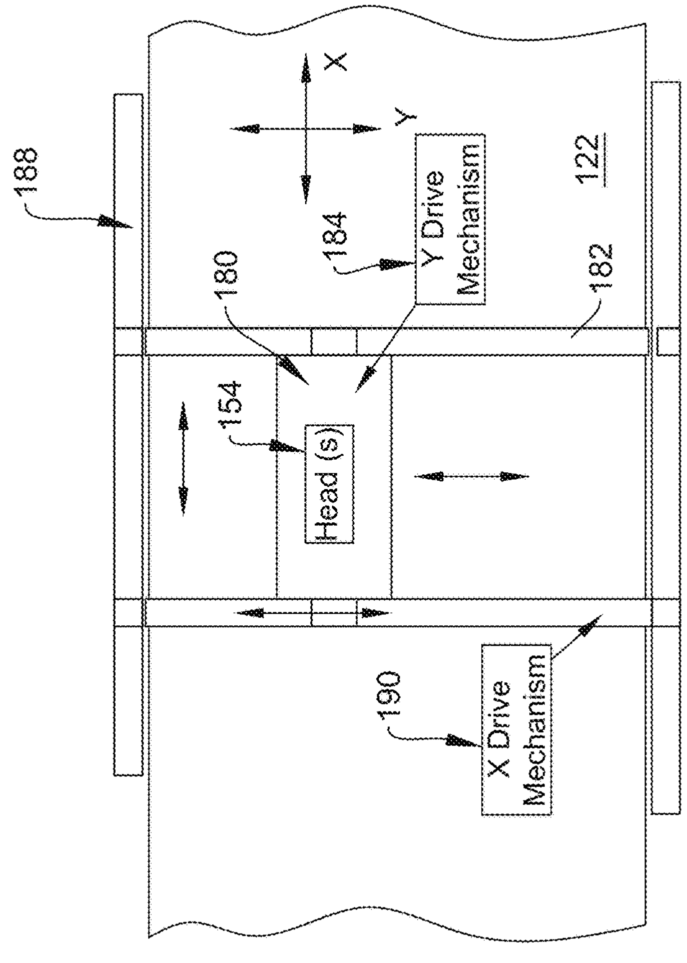
FIG. 4E is a top view of an embodiment of a carriage assembly operable via an x-y drive mechanism to deposit layers of the multiple layered print structure.

In an alternate embodiment shown in FIG. 4F, heads 154 are moved in an x-y pattern relative to the substrate 122. As shown one or more heads 154 are supported on carriage 180 movable along rail or track 182 in the y direction 160 via y drive mechanism 184. Track or rail 182 is coupled to and movable along x track 188 via operation of x drive mechanism 190 to provide x-y axis movement of the heads 154 relative to the substrate to deposit the multiple layered print structure 120 as described. As schematically shown in FIG. 4F, the z-drive assembly 166 includes z-drive mechanism 192 coupled to the carriage 180 or substrate platform 165 to adjust an elevation of one or both of the carriage 180 or substrate platform 165 to adjust the spacing between the heads 154 and substrate 122 for printing.

Figure 4G:
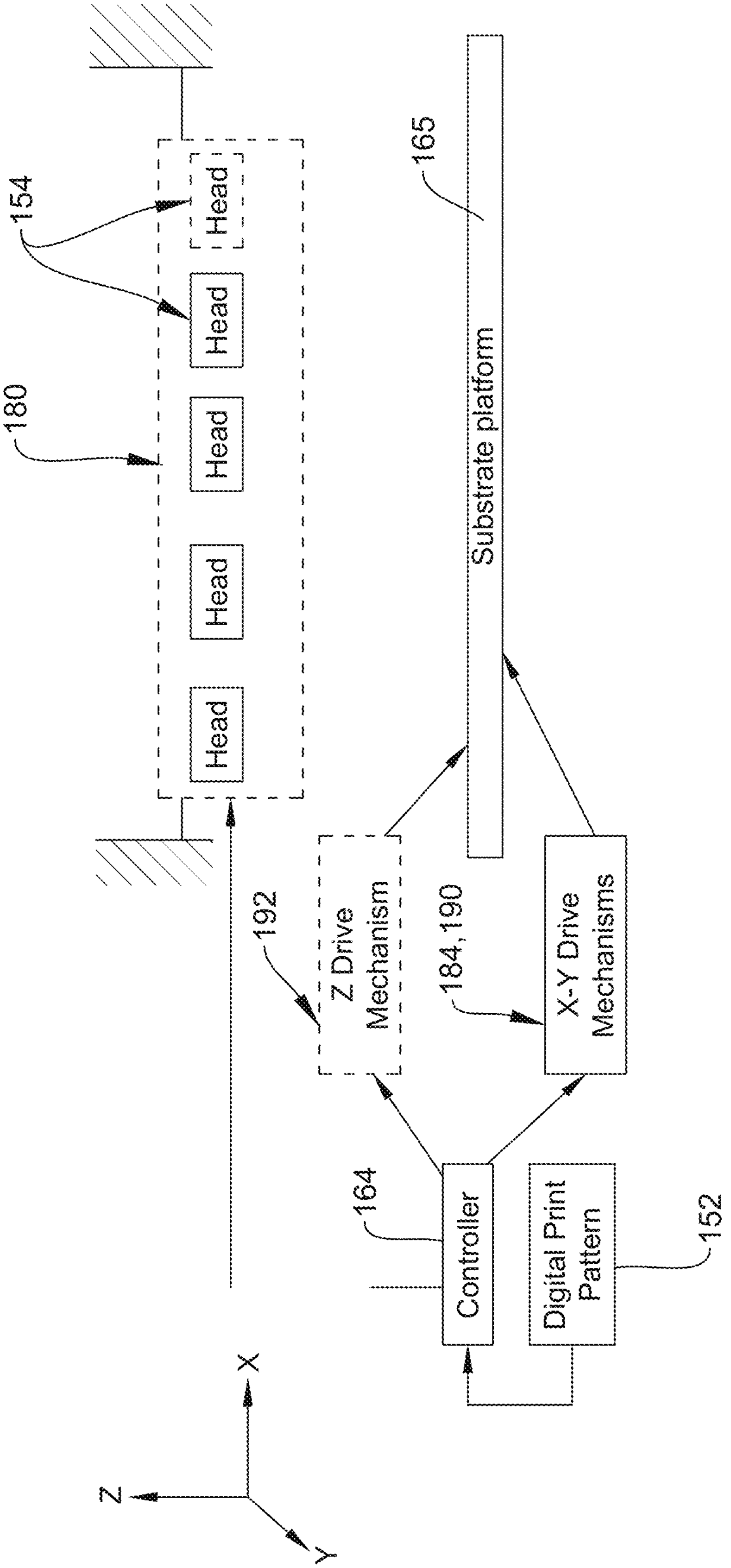
FIG. 4G schematically illustrates an embodiment of a printing apparatus including a substrate platform movable via x-y drive mechanisms to deposit multiple print layers.

In the illustrated embodiment of FIG. 4G, the one or more carriages 180 or carriage assembly are stationary or fixed and the substrate platform 165 moves in the x-y plane via x-y drive mechanisms to deposit the print layers on the substrate 122. In addition, as schematically shown, the z-drive mechanism is coupled to the substrate platform 165 to move the platform in the z-direction to adjust spacing between the heads and the substrate platform 165 as the print layers are deposited as previously described. Alternatively, the heads move in the x-direction where the substrate may move in the y-direction eliminating z-directional movement. While particular embodiments are shown, the application is not limited to the particular arrangements or embodiments shown and any combination of drive mechanisms, carriages or other structures can be used for printing the multiple layered structure 120. A combination of various digital printing processes such as laser, indigo, and/or ink-jet, for example. could be used inline or offline to create the multiple layered print structure of the present disclosure. For example, in one embodiment a combination of ink-jet and laser/indigo printing processes may be used. Though it should be understood that any combination is contemplated by the present disclosure.

Figure 4H:
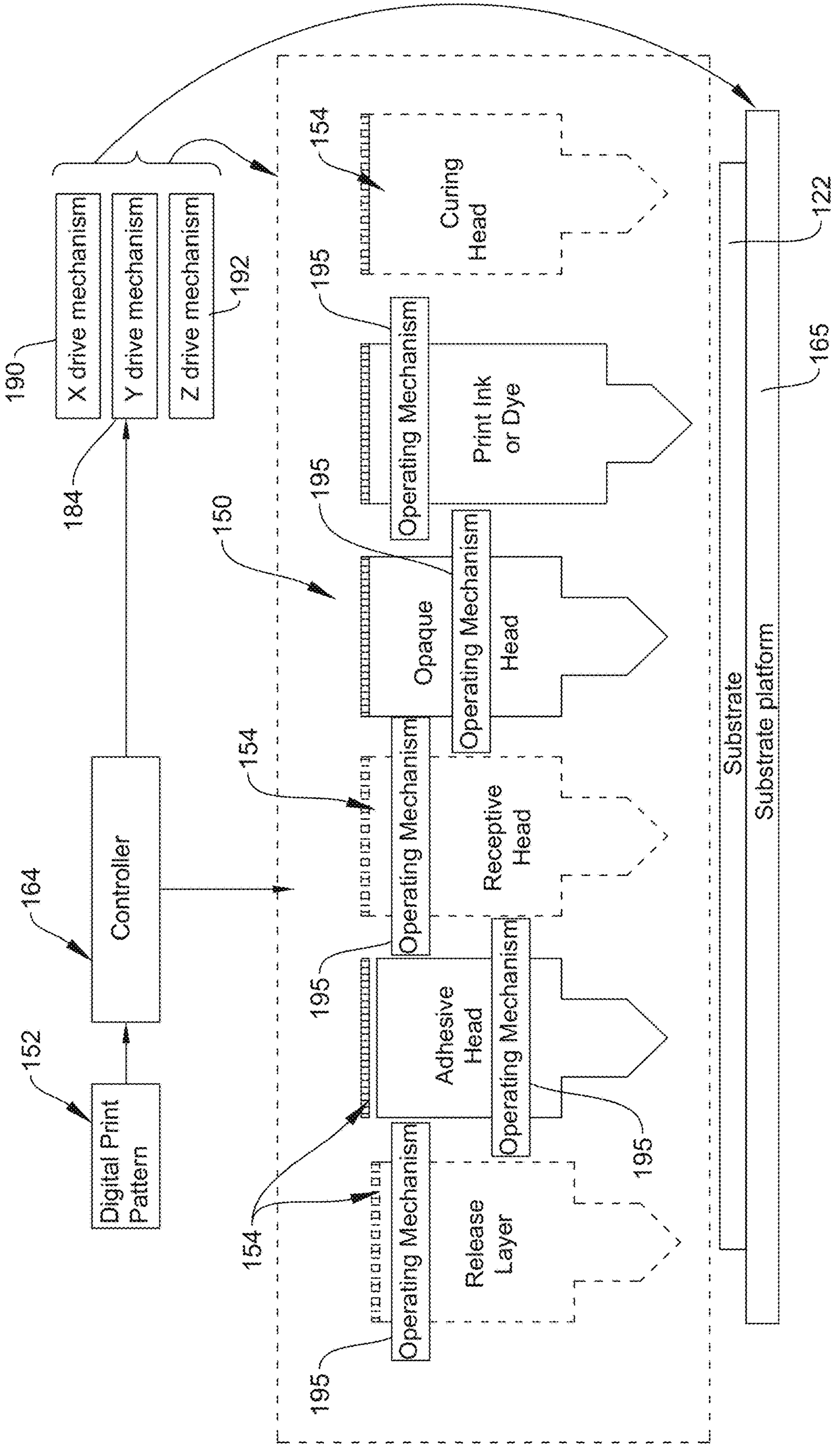
FIG. 4H schematically illustrates heads for an embodiment of the printing apparatus.

FIG. 4H illustrates heads 154 of an illustrative printing apparatus 150. In the embodiment shown, the plurality of heads 154 include one or more of an adhesive layer head 154, a print layer head 154, and an opaque layer head 154. Additionally, the plurality of heads includes a receptive layer head for depositing the receptive layer and a curing head to dry and cure liquid ink layers deposited on the substrate 122. Each of the heads includes a controllable operating mechanism 195 that interfaces with controller 164 through circuitry to dispense or prints material on the substrate based upon the digital print pattern 152. Although a particular order is shown for the heads, application is not limited to a particular order or arrangement, and order or arrangement will depend upon the particular multiple layered print structure 120.

Illustratively the adhesive head can be a spray head including a valve structure or other operating mechanism to deposit adhesive or other layer(s) in response to input from the controller 164. The adhesive layer 142 can be a flowable/liquid adhesive or a powered adhesive. In illustrative embodiments, the one or more heads include an extrusion head having a movable pin operable to form the controllable operating mechanism 195 for selectively dispensing material from the head. In other embodiments, the heads include a PZT print head operable to controllably dispense material via a piezoelectric (PZT) transducer element via control signals provided through an electrical interface or cable. Other heads for dispensing layers of the multiple layered print structure include thermal print heads operable via thermal transducer elements or electrostatic print heads operable through electrostatic transducer elements to selectively print the multiple layers of the print structure. In illustrated embodiments, a curing head 154 is provided to dry and cure liquid or water-based inks following deposition from one or more print heads to form the shape profile 124 and print features 126 of the multiple layered print structure 120. The curing head may utilize one or more of following curing technologies such as thermal curing, UV curing and EB curing technology. It will be appreciated, that the disclosure includes embodiments where the curing process may be completed either inline or offline, and further contemplates alternate curing head arrangements and/or curing assemblies.

Figure 4I:
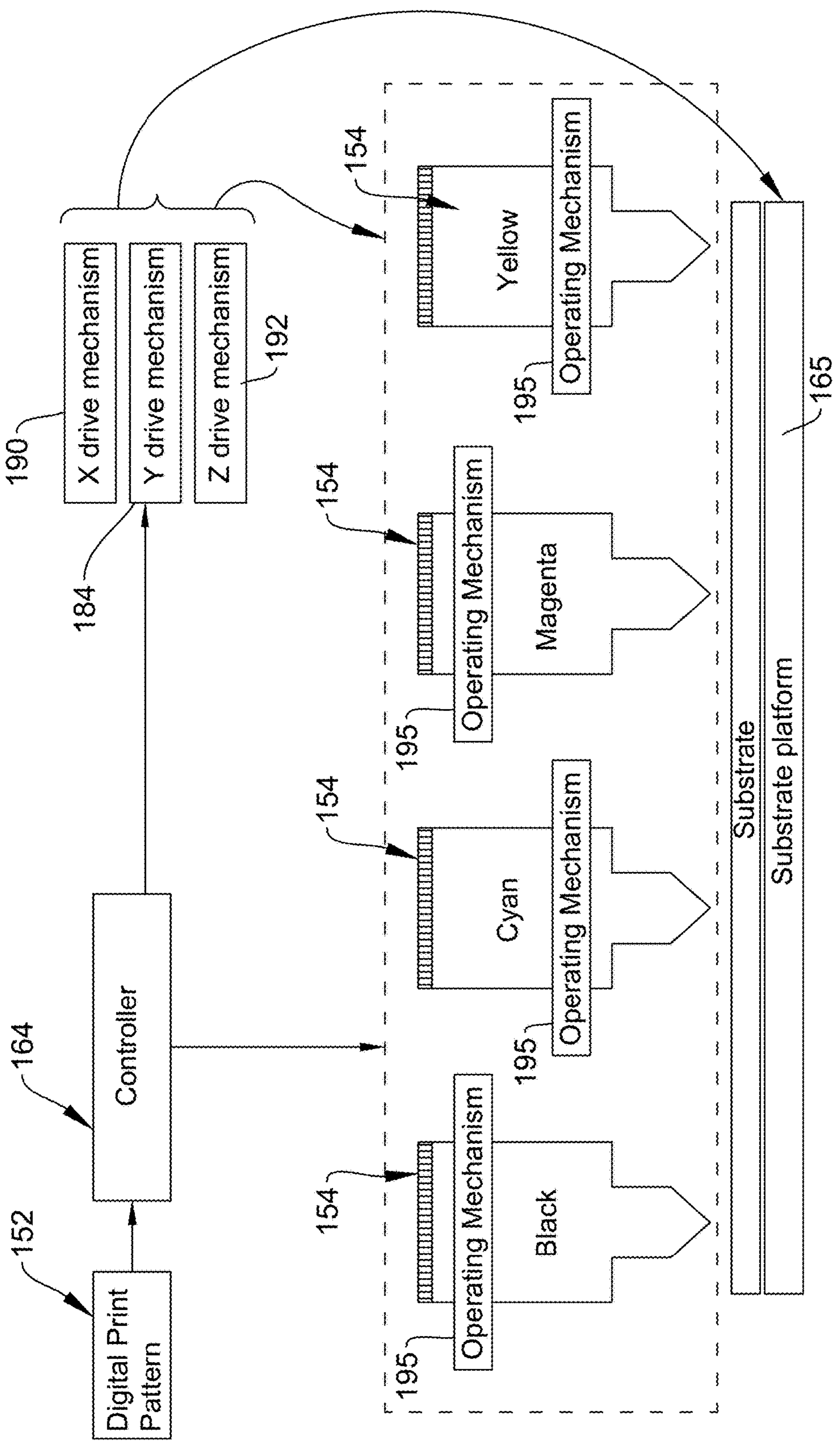
FIG. 4I illustrates another embodiment of heads for a printing apparatus of the present application.
Figure 4J:
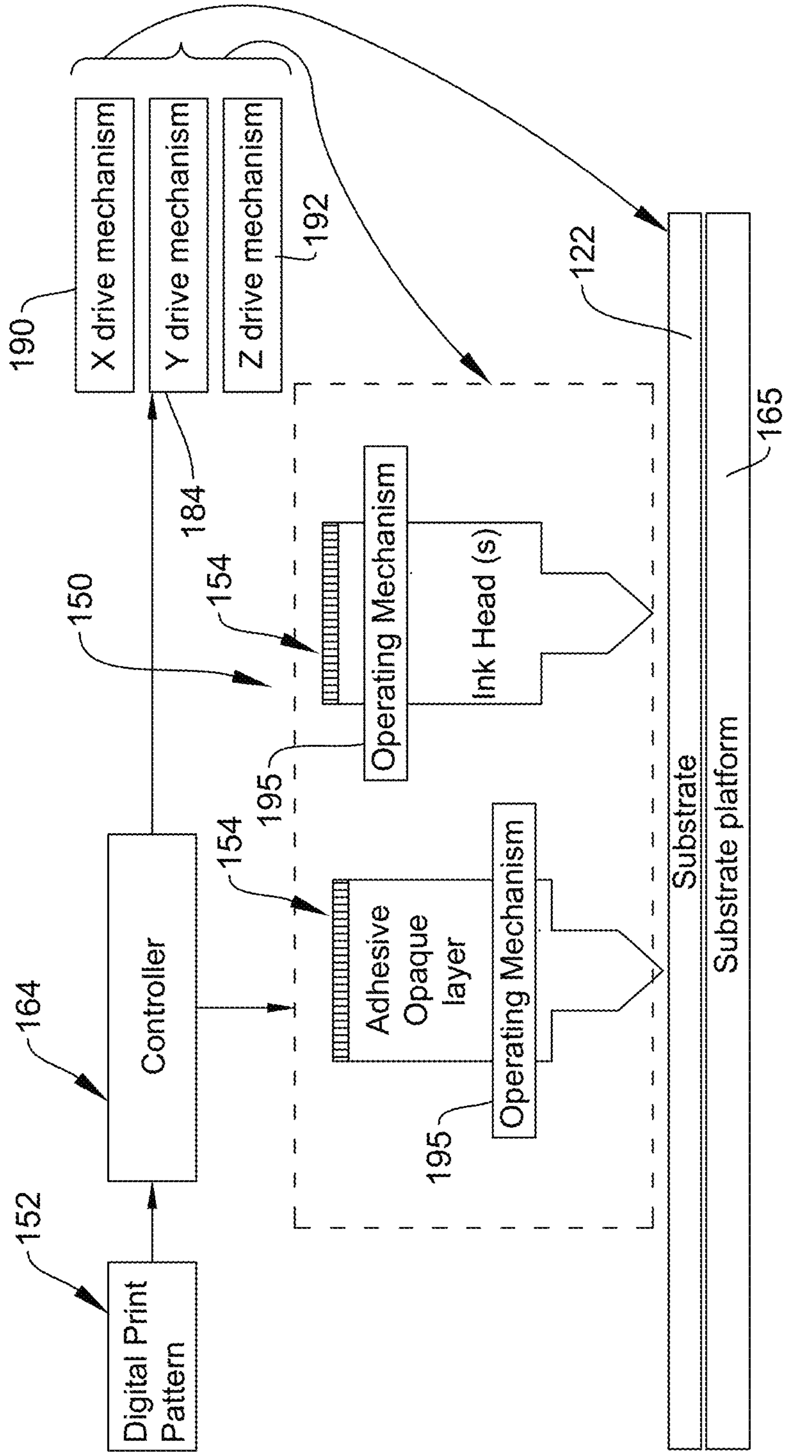
FIG. 4J schematically illustrates another embodiment of printing heads for a printing apparatus of the present application.

In illustrated embodiments, the printing apparatus 150 includes a plurality of ink heads or cartridges to deposit multiple colored print layers. As shown in FIG. 4I, the plurality of ink heads or cartridges include black, cyan, magenta and yellow ink cartridges or heads. The black, cyan, magenta and yellow inks are contained in reservoirs of the cartridges or heads 168 and dispensed through operating mechanism 195 in response to input from the controller 164 as previously described. In another embodiment shown in FIG. 4J, the apparatus includes a composite print head for both the adhesive and obscuring layers 142, 144.

Figure 5A:
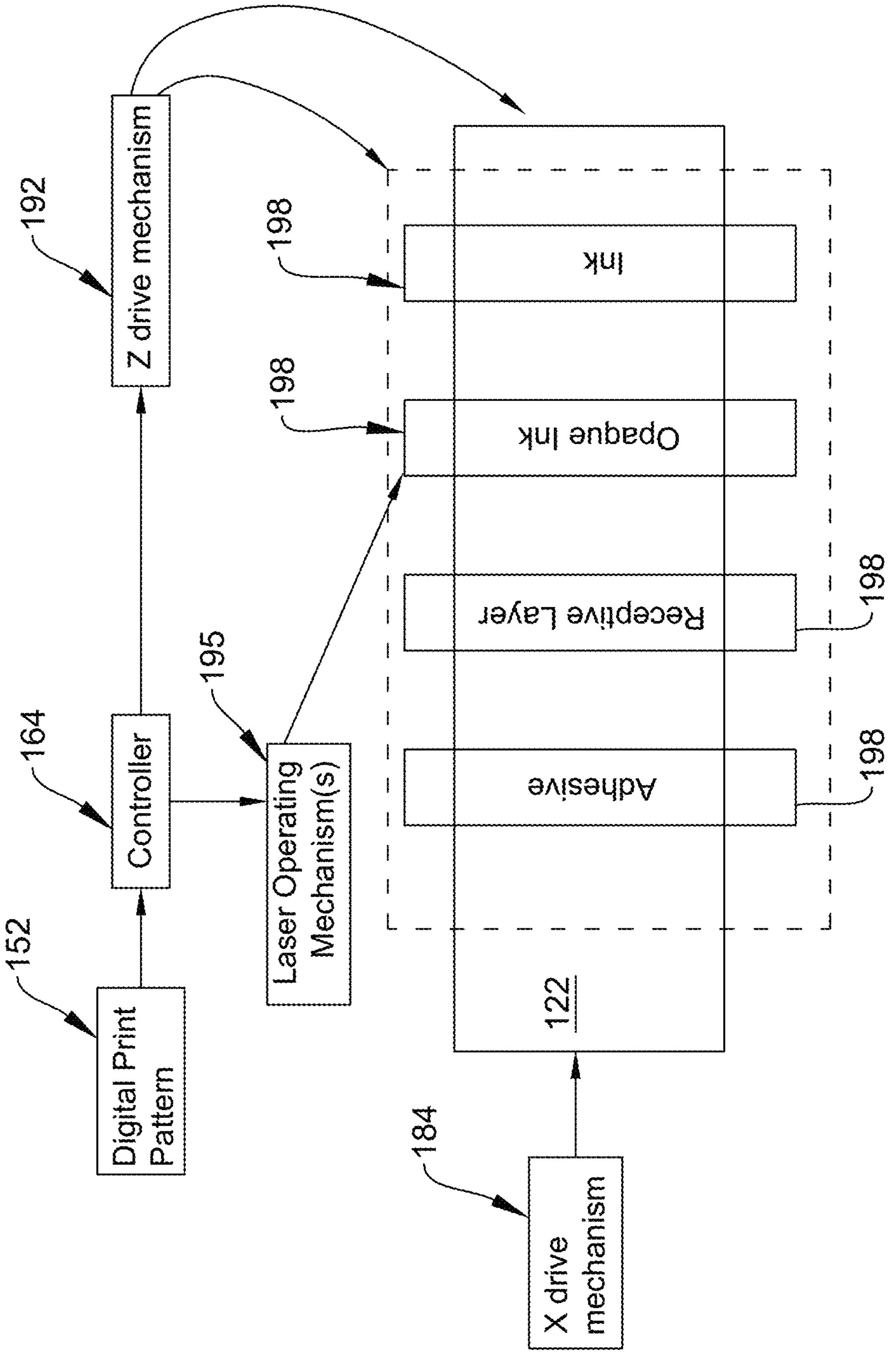
FIG. 5A illustrates an embodiment of a printing apparatus including printing drums for depositing multiple print layers of the multiple layered print structure.
Figure 5B:
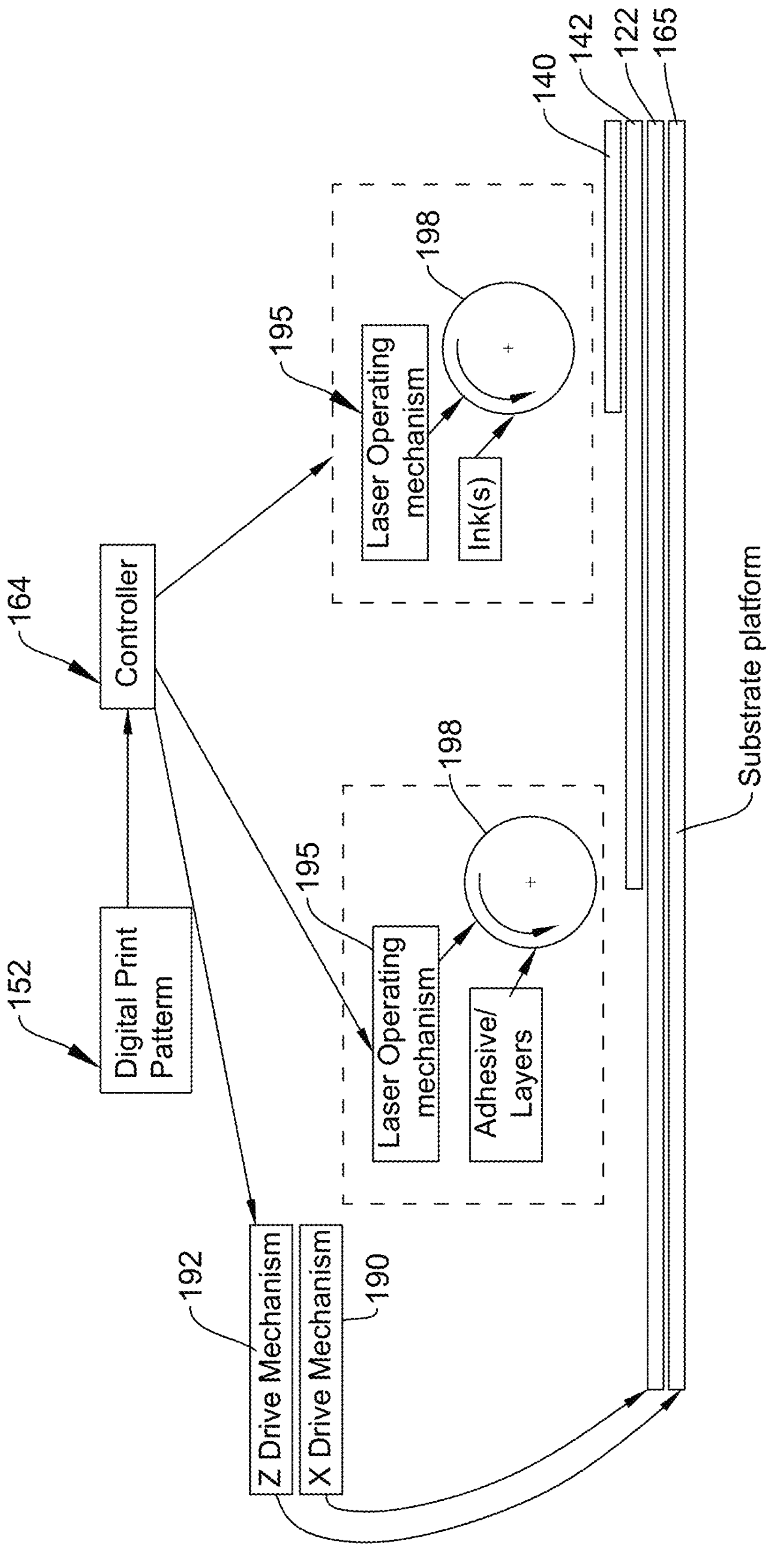
FIG. 5B is a side view of a printing apparatus including a plurality of drums.
Figure 5C:
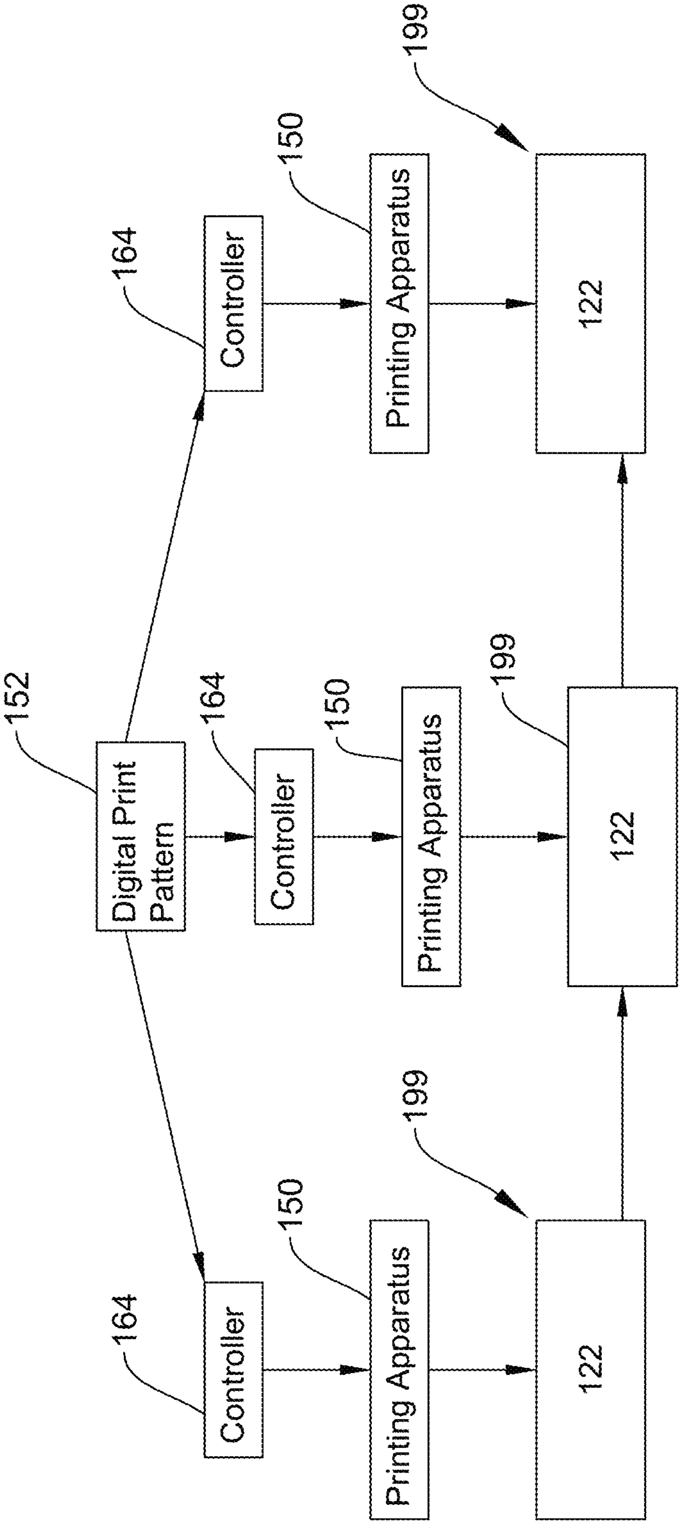
FIG. 5C illustrates a printing process using multiple printing apparatus at multiple printing stations to deposit the multiple layered print structure.

In alternate embodiments of the printing apparatus for printing the multiple layered printing structure, the printing apparatus includes one or more rotating photosensitive drums 198 for depositing one or more layers of the multiple layered structure. In the embodiment shown in FIG. 5A-5B, the printing apparatus includes multiple drums 198 for depositing the adhesive, receptive layer, opaque layer, printing ink layers, and/or any additional optional release layer or other layer(s) based upon the digital print pattern 152. A charged pattern or differentially charged image is applied to the drums 198 through a laser device or other operating mechanism 195 to collect charged powder or ink and transfer the powder or ink image to the substrate. In alternate embodiments, the printing apparatus uses liquid electrophotography printing processes and machines such as machines available from HP Indigo of HP Inc. of Palo Alto California, for example. In the embodiment shown, a separate drum 198 may be used to apply charged adhesive powder, receptive, opaque, printing ink powders and/or additional optional release layer, or materials, however in alternate embodiments one or more of the multiple layers or powders may be combined and deposited on a single drum 198. Alternatively, drive arrangements or carriages as offered by various electrophotography or liquid electrophotography printing processes such as laser printers, copiers, digital presses, and/or HP Indigo, for example could be used to create the multi-layered print structure.

In alternate embodiments of the present application, the process of printing the multiple layers uses multiple printing apparatus to print one or more layers of the multiple layered structure at separate printing stations 199. In an illustrative embodiment, the multiple printing apparatus or stations include an adhesive printing apparatus to deposit the adhesive layer, an opaque printing apparatus to deposit the opaque layer and an ink printing apparatus to deposit the ink layers. It should be understood that the application is not limited to a particular number of stations 199 and the number of stations will depend upon the number of layers deposited to form the multiple layered print structure. Each of the printing stations or processing stations may include x-y-z drive mechanism(s) coupled to the carriage/head, drum and/or substrate platform 165, in some embodiments. The x-y-z drive mechanism(s) receives input from the controller 164 to position the head/substrate for printing in response to the digital print pattern 152.

Figure 6A:
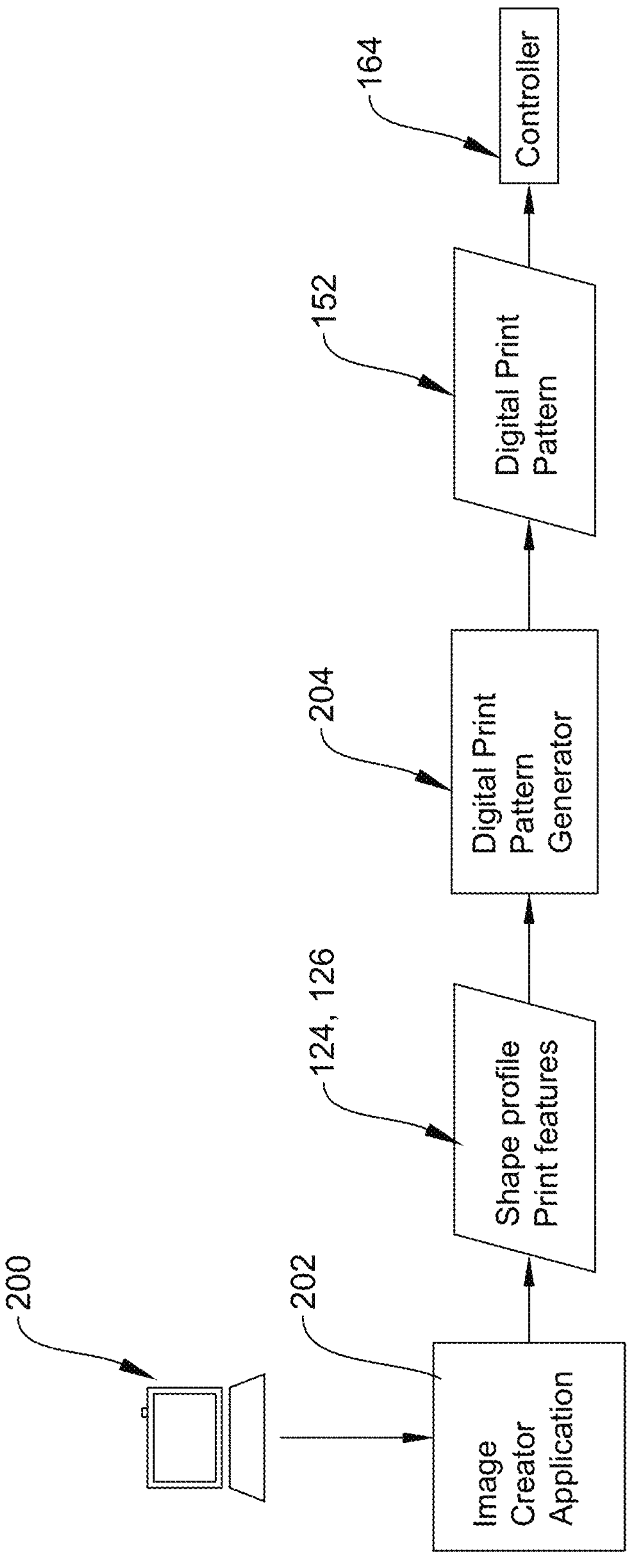
FIG. 6A illustrates an application for converting an image or design into a digital print pattern for use by a controller to control the plurality of heads or printing apparatus.

As previously described, the controller 164 may use a digital print pattern 152 to create the multiple layered print structure 120 for the image or design. The image or design can be created through a computer 200 having hardware and software components to run an image creator software or application 202 to create an image having a shape profile 124 and print features 126 as shown in FIG. 6A. A user creates the desired image via interface with the creator software or application 202 using input devices such a mouse, keyboard, or stylus pen (not shown). Once the image is complete, a digital print pattern generator or application 204 compiles or generates the digital print pattern 152. The digital print pattern generator 204 includes instructions and code to generate the digital print pattern 152 for the multiple layered structure 120.

Figure 6B:
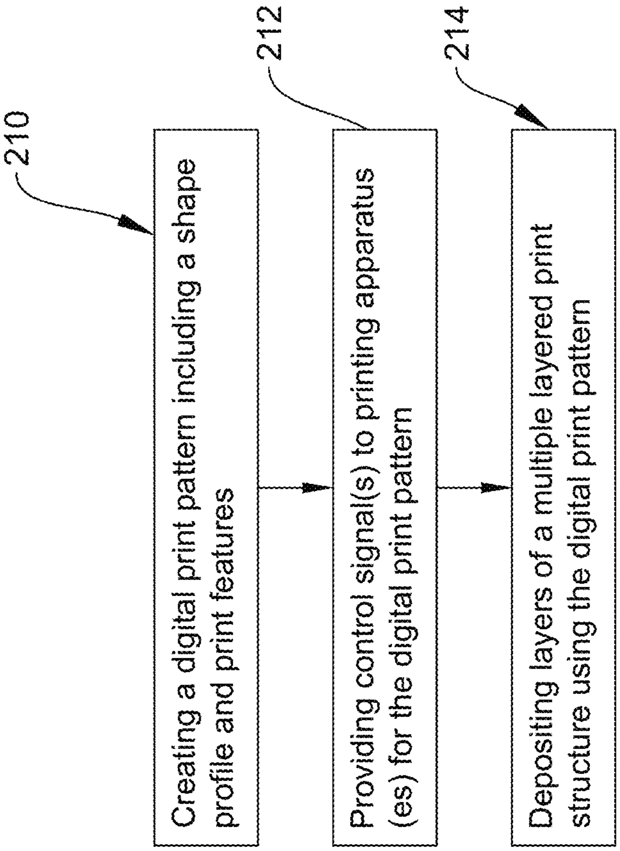
FIG. 6B is a flow chart illustrating steps for printing the multiple layered print structure for fabric or cloth.

The digital print pattern 152 may be used by the controller 164 to control the printing apparatus including the drive and operating mechanisms of the printing apparatus to print the multiple layered print structure 120. Thus, as shown in FIG. 6B, digital print pattern 152 for an image or design may be created using a computer application or software in step 210. In step 212, the control signals for the operating mechanisms and drive mechanisms are provided to the printing apparatus(s) and in step 214, layers of the multiple layered print structure are deposited using the digital print pattern 152.

In embodiments shown in FIGS. 7A-7D, the multiple layers of the multiple layered print structure 120 are deposited on a substrate 122 having a base layer 220 and a release layer or coating 222 to transfer the multiple layered print structure 120 to a fabric or cloth item 224. Illustrative base layers 220 are formed of a material capable of withstanding high temperatures and which can handle multiple print layers and coatings as described. Suitable base layers 220 include, but are not limited to, a paper web, plastic film, wood pulp fiber paper, metal foil, parchment paper, lithographic printing paper, clear film or similar materials. The release layer or coating 222 may be applied to the base layer 220 of the substrate 122 to facilitate separation of the multiple layered print structure 120 from the substrate 122 for image transfer. Illustratively, the release layer or coating may be a silicone coating, or wax-based material, or other material or combination of materials that releasably adheres the multiple layered print structure 120 to the base layer 220 of the substrate for application to fabric or cloth item 224. The release layer in some embodiments may be a continuous coated layer, or in other embodiments may be spot printed. The release layer could be spot printed/applied by digital printing methods such as laser, liquid electrophotography, and/or inkjet, for example to create the desired shape profile.

Figure 7A:
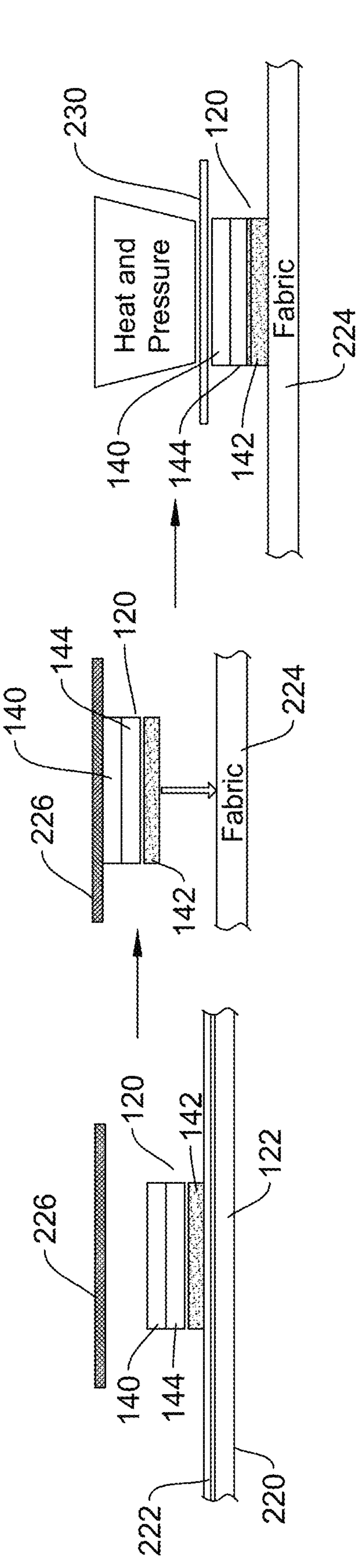
FIG. 7A illustrates an embodiment for transferring the multiple layered print structure to a fabric or cloth item via application of heat and pressure.

As shown in FIG. 7A, adhesive, opaque and print layers 142, 144, 140 are deposited on a substrate 122 to form the multiple layered print structure 120 as previously described. As shown, the multiple layered structure 120 may be released from the substrate 122 and placed on the fabric item 224. In an illustrated embodiment, a releasable tacky layer or masking tape 226, for example may be used to facilitate release of the multiple layered structure from the substrate. Heat and pressure are applied to the multiple layered structure 120 to melt the adhesive layer 142 to adhere the structure to the cloth or fabric item 224. Heat and pressure may be applied through a protective or non-stick sheet 230 to protect the multiple layered print structure 120 and fabric from the heat source. In embodiments where a pressure-sensitive adhesive (PSA) is used, application of heat is optional when transferring to the receptor.

Figure 7B:
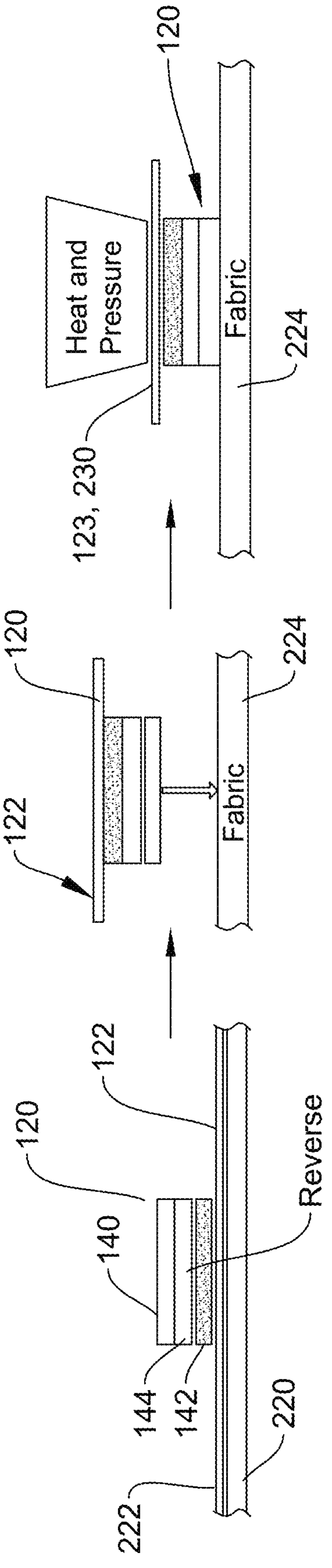
FIGS. 7B-7D illustrate other embodiments for transferring the multiple layered structure to a fabric or cloth item

In an alternate embodiment shown in FIG. 7B, the multiple layered print structure 120 includes an adhesive layer 142 printed on the substrate 122, a reverse print layer 140 printed on the adhesive layer 142 and an opaque layer 144 layer printed on the reverse print layer 140. The layers are similarly printed on substrate 122 having the release coating or layer 222. For attachment to the fabric or cloth item 224, the structure 120 is flipped so that the adhesive layer 142 is on top and the opaque layer 144 abuts a surface of the cloth or fabric item 224. Heat and pressure are applied to the multiple layered print structure 120 through protective sheet 230 to adhere the structure to the fabric or cloth item 224. In an illustrative embodiment, heat and pressure are applied through substrate 122 which forms a protective sheet in an illustrative embodiment. Following attachment to the fabric or cloth item 224, the substrate 122 is released from the multiple layered structure 120. As described, the print layer 140 of the multiple layered structure 120 is printed with a reverse or mirror image of the design or image so that after the structure 120 is flipped the image and feature orientation is not mirror image.

Figure 7C:
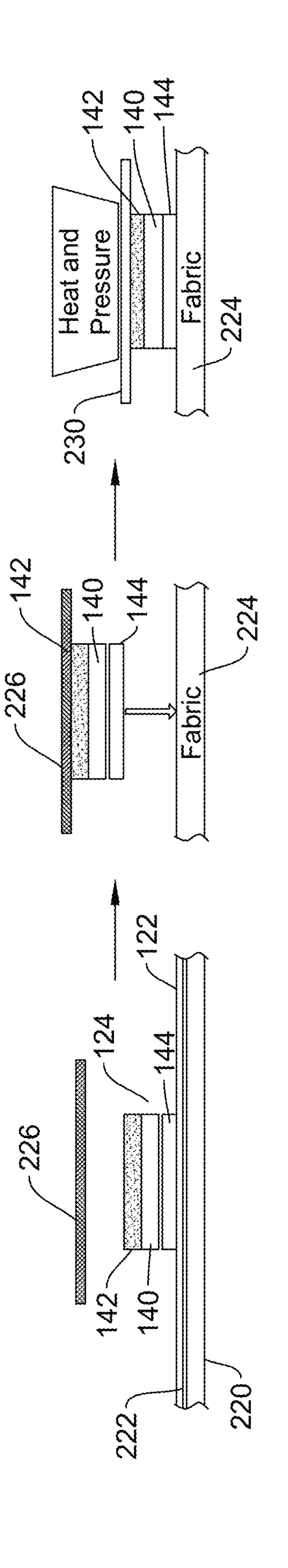
Figure 7D:
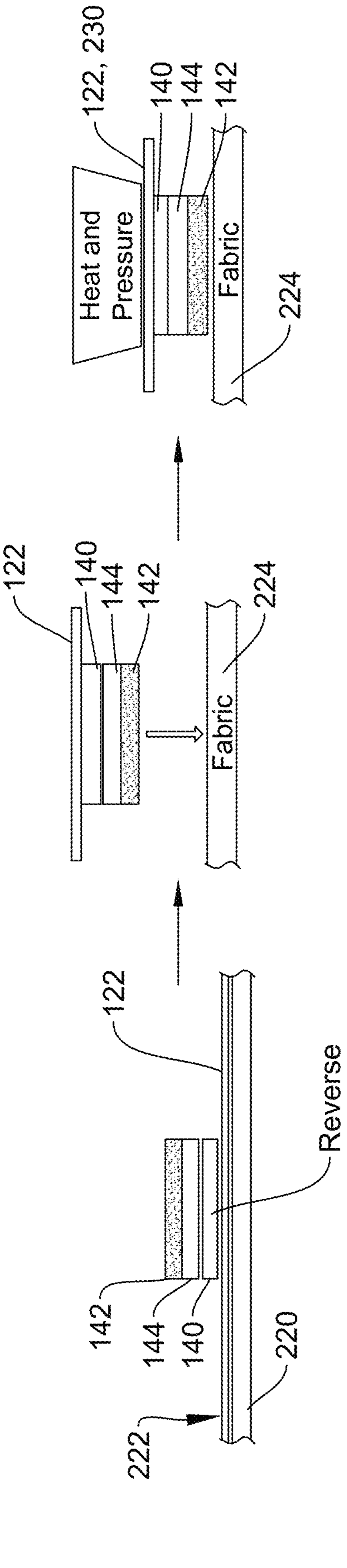

In an alternate embodiment shown in FIG. 7C, the opaque layer 144 is printed on the substrate, print layer(s) 140 are printed on the opaque layer 144 and the adhesive layer 142 is printed on the print layer(s) 140. As shown, the layers of the structure are released from the substrate 122 and adhered to the cloth or fabric item 224 via the application of heat and pressure to melt the adhesive layer 142 into the fabric or cloth item 224. In the illustrated embodiment, a releasable tacky layer or masking tape 226 may be used to facilitate release of the multiple layered structure from the substrate. In the embodiment shown in FIG. 7D, a reverse image print layer 140 may be deposited on the substrate 122. Opaque layer 144 is deposited on print layer(s) 140 and the adhesive layer 142 is deposited on the opaque layer as shown. The print structure 120 is flipped as previously described with respect to the embodiment of FIG. 7B for attachment to the fabric or cloth item 224. As described, the substrate 122 is used as a protective sheet 230 to apply heat and pressure to attach the multiple layered structure 120 to the fabric or cloth item 224. Once attached the substrate 122 is removed.

As described, the multiple layered print structure 120 includes a shape profile 124 and one or more print features 126 to form a particular image or design according to a digital print pattern 152. Various materials can be used for the one or more print layer(s), opaque layer(s) and adhesive layer(s) as described in U.S. Pat. Nos. 7,785,764, 8,613,988, 9,227,461 and 9,371,148 to form the substrate and layers of the multiple layered print structure 120, the subject matter of which is incorporated in its entirety by reference into the disclosure of the present application.

In the foregoing description various embodiments of the invention have been presented for the purpose of illustration and description. With regard to recitations of fabric or cloth, it should be understood that such terms includes woven and non-woven fabrics as well as nylon and polyester fabrics and fabrics or cloths made from natural materials, and that embodiments of the present disclosure are in no way limited to a particular fabric or cloth. They are not intended to be exhaustive or to limit the invention to the precise form disclosed and include articles such as paper, wood, glass, and any other item. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. A method of transferring a multiple layer print structure, by:

positioning the multiple layered structure onto a receptor element such that the adhesive layer is in direct contact with the receptor element;

wherein, the multiple layered print structure comprises of: (i) a removable substrate; (ii) at least one print layer printed on the removable substrate using one digital ink-jet print method-wherein the at least one print layer forms a design, where, at least one print layer comprising at least one opaque layer printed on the design using one digital ink-jet print method; (iii) a heat-sensitive adhesive layer applied to the opaque layer, wherein the adhesive layer conforms to the opaque layer, whereby the at least one print layer, including the opaque layer, and the heat-sensitive adhesive layer are adapted to be separated from the removable substrate and for transfer of the design. to a receptor;

applying heat and pressure to the multiple layered print structure SO that the multiple layered print structure adheres to the receptor element;

removing the removable substrate for completion of design transfer to the receptor.

2. The method of transferring a multiple layer print structure of claim 1, wherein the removable substrate acts as a protective sheet during the transfer process and is removed for completion of transfer.

3. The method of transferring a multiple layer print structure of claim 2, wherein additional protective sheets are used to facilitate the transfer process.

4. A method of transferring a multiple layer print structure, by:

positioning the multiple layered structure onto a receptor element such that the adhesive layer is in direct contact with the receptor element;

wherein, the multiple layered print structure comprises of: (i) a removable substrate; (ii) at least one print layer printed on the removable substrate using one digital ink-jet print method-wherein the at least one print layer forms a design, where, at least one print layer comprising at least one opaque layer printed on the design using one digital ink-jet print method; (iii) a heat-sensitive adhesive layer printed using one digital ink-jet print method on the opaque layer, wherein the adhesive layer conforms to the opaque layer, whereby the at least one print layer, including the opaque layer, and the heat-sensitive adhesive layer are adapted to be separated from the removable substrate and for transfer of the design to a receptor;

applying heat and pressure to the multiple layered print structure SO that the multiple layered print structure adheres to the receptor element;

removing the removable substrate for completion of design transfer to the receptor.

5. The method of transferring a multiple layer print structure of claim 4, wherein the removable substrate acts as a protective sheet during the transfer process and is removed for completion of transfer.

6. The method of transferring a multiple layer print structure of claim 5, wherein additional protective sheets are used to facilitate the transfer process.

7. A method of transferring a multiple layer print structure, by:

positioning the multiple layered structure onto a receptor element such that the adhesive layer is in direct contact with the receptor element;

wherein, the multiple layered print structure comprises of: (i) a removable substrate; (ii) at least one opaque or white layer printed on the removable substrate using one digital ink-jet print method-wherein the at least one print layer forms a pre-set shape profile; (iii) a heat-sensitive adhesive layer applied to at least one opaque or white layer, wherein the adhesive layer conforms to the at least one opaque or white layer, whereby the at least one opaque or white layer, and the heat-sensitive adhesive layer. are adapted to be separated from the removable substrate and for transfer of the shape profile to a receptor;

applying heat and pressure to the multiple layered print structure so that the multiple layered print structure adheres to the receptor element;

removing the removable substrate for completion of design transfer to the receptor.

8. The method of transferring a multiple layer print structure of claim 7, wherein the removable substrate acts as a protective sheet during the transfer process and is removed for completion of transfer.

9. The method of transferring a multiple layer print structure of claim 8, wherein additional protective sheets are used to facilitate the transfer process.

10. A method of transferring a multiple layer print structure, by:

positioning the multiple layered structure onto a receptor element such that the adhesive layer is in direct contact with the receptor element;

wherein, the multiple layered print structure comprises of: (i) a removable substrate; (ii) at least one opaque or white layer printed on the removable substrate using one digital ink-jet print method-wherein the at least one print layer forms a pre-set shape profile; (iii) a heat-sensitive adhesive layer printed using one digital ink-jet print method on the print layer, wherein the adhesive layer conforms to the print layer, whereby the at least one print layer, and the heat-sensitive adhesive layer are adapted to be separated from the removable substrate and for transfer of the design to a receptor;

applying heat and pressure to the multiple layered print structure so that the multiple layered print structure adheres to the receptor element;

removing the removable substrate for completion of design transfer to the receptor.

11. The method of transferring a multiple layer print structure of claim 10, wherein the removable substrate acts as a protective sheet during the transfer process and is removed for completion of transfer.

12. The method of transferring a multiple layer print structure of claim 11, wherein additional protective sheets are used to facilitate the transfer process.

13. A method of transferring a multiple layer print structure, by:

positioning the multiple layered structure onto a receptor element such that the adhesive layer is in direct contact with the receptor element;

wherein, the multiple layered print structure comprises of: (i) a substrate; (ii) at least one release layer applied on substrate wherein the at least one release layer is adapted to receive at least one or more print layer; where, the at least one release layer is printed using digital print method; also where, the substrate demonstrates removable characteristics upon application of the at least one or more release layer; (iii) at least one print layer printed on the release layer using one digital ink-jet print method-wherein the at least one print layer forms a design; where, at least one print layer comprising at least one opaque layer printed on the design using one digital ink-jet print method; (iv) a heat-sensitive adhesive layer applied to the opaque layer, wherein the adhesive layer conforms to the opaque layer, whereby the at least one print layer, including the opaque layer, and the heat-sensitive adhesive layer are adapted to be separated from the removable substrate and for transfer of the design to a receptor;

applying heat and pressure to the multiple layered print structure so that the multiple layered print structure adheres to the receptor element;

removing the removable substrate for completion of design transfer to the receptor.

14. The method of transferring a multiple layer print structure of claim 13, wherein the removable substrate acts as a protective sheet during the transfer process and is removed for completion of transfer.

15. The method of transferring a multiple layer print structure of claim 14, wherein additional protective sheets are used to facilitate the transfer process.

16. A method of transferring a multiple layer print structure, by:

positioning the multiple layered structure onto a receptor element such that the adhesive layer is in direct contact with the receptor element;

wherein, the multiple layered print structure comprises of: (i) a substrate; (ii) at least one release layer applied on substrate wherein the at least one release layer is adapted to receive at least one or more print layer; where, the at least one release layer is printed using digital print method; also where, the substrate demonstrates removable characteristics upon application of the at least one or more release layer; (iii) at least one print layer printed on the removable substrate using one digital ink-jet print method, wherein the at least one print layer forms a design; where, at least one print layer comprising at least one opaque layer on the design printed using one digital ink-jet print method; (iv) a heat-sensitive adhesive layer printed using one digital ink-jet print method on the opaque layer, wherein the adhesive layer conforms to the opaque layer, whereby the at least one print layer, including the opaque layer, and the heat-sensitive adhesive layer are adapted to be separated from the removable substrate and for transfer of the design to a receptor;

applying heat and pressure to the multiple layered print structure SO that the multiple layered print structure adheres to the receptor element;

removing the removable substrate for completion of design transfer to the receptor.

17. The method of transferring a multiple layer print structure of claim 16, wherein the removable substrate acts as a protective sheet during the transfer process and is removed for completion of transfer.

18. The method of transferring a multiple layer print structure of claim 17, wherein additional protective sheets are used to facilitate the transfer process.

19. A method of transferring a multiple layer print structure, by:

positioning the multiple layered structure onto a receptor element such that the adhesive layer is in direct contact with the receptor element;

wherein, the multiple layered print structure comprises of: (i) a substrate; (ii) at least one release layer applied on substrate wherein the at least one release layer is adapted to receive at least one or more print layer; where, the at least one release layer is printed using digital print method; also where, the substrate demonstrates removable characteristics upon application of the at least one or more release layer; (iii) at least one opaque or white layer printed on the at least one release layer using one digital ink-jet print method wherein the at least one print layer forms a pre-set shape profile (iv) a heat-sensitive adhesive layer applied to at least one opaque or white layer, wherein the adhesive layer conforms to the opaque layer, whereby the at least one print layer, including the opaque layer, and the heat-sensitive adhesive layer are adapted to be separated from the removable substrate and for transfer of the design to a receptor;

applying heat and pressure to the multiple layered print structure SO that the multiple layered print structure adheres to the receptor element;

removing the removable substrate for completion of design transfer to the receptor.

20. The method of transferring a multiple layer print structure of claim 19, wherein the removable substrate acts as a protective sheet during the transfer process and is removed for completion of transfer.

21. The method of transferring a multiple layer print structure of claim 20, wherein additional protective sheets are used to facilitate the transfer process.

22. A method of transferring a multiple layer print structure, by:

positioning the multiple layered structure onto a receptor element such that the adhesive layer is in direct contact with the receptor element;

wherein, the multiple layered print structure comprises of: (i) a substrate; (ii) at least one release layer applied on substrate wherein the at least one release layer is adapted to receive at least one or more print layer; where, the at least one release layer is printed using digital print method; also where, the substrate demonstrates removable characteristics upon application of the at least one or more release layer; (iii) at least one opaque or white layer printed on the at least one release layer using one digital ink-jet print method wherein the at least one print layer forms a pre-set shape profile (iv) a heat-sensitive adhesive layer printed using one digital ink-jet print method on the opaque layer, wherein the adhesive layer conforms to the opaque layer, whereby the at least one print layer, including the opaque layer, and the heat-sensitive adhesive layer are adapted to be separated from the removable substrate and for transfer of the design to a receptor;

applying heat and pressure to the multiple layered print structure so that the multiple layered print structure adheres to the receptor element;

removing the removable substrate for completion of design transfer to the receptor.

23. The method of transferring a multiple layer print structure of claim 22, wherein the removable substrate acts as a protective sheet during the transfer process and is removed for completion of transfer.

24. The method of transferring a multiple layer print structure of claim 23, wherein additional protective sheets are used to facilitate the transfer process.

* * * * *